US011972222B2

(12) United States Patent
Gill et al.

(10) Patent No.: US 11,972,222 B2
(45) Date of Patent: Apr. 30, 2024

(54) METHOD, SYSTEM, AND COMPUTER PROGRAM PRODUCT FOR NATURAL LANGUAGE PROGRAMMING OF A NEW FUNCTION OR SKILL

(71) Applicant: Kognitos, Inc., San Jose, CA (US)

(72) Inventors: Binny Sher Gill, San Jose, CA (US); Aaron Dean Brown, Wausau, WI (US)

(73) Assignee: Kognitos, Inc.

( * ) Notice: Subject to any disclaimer, the term of this patent is extended or adjusted under 35 U.S.C. 154(b) by 329 days.

(21) Appl. No.: 17/452,047

(22) Filed: Oct. 22, 2021

(65) Prior Publication Data

US 2022/0156466 A1 May 19, 2022

Related U.S. Application Data

(60) Provisional application No. 63/105,176, filed on Oct. 23, 2020.

(51) Int. Cl.
*G06F 40/40* (2020.01)
*G06F 8/33* (2018.01)
*G06N 5/022* (2023.01)
*G06N 5/04* (2023.01)

(52) U.S. Cl.
CPC .............. *G06F 40/40* (2020.01); *G06F 8/33* (2013.01); *G06N 5/022* (2013.01); *G06N 5/04* (2013.01)

(58) Field of Classification Search
CPC .................................. G06F 40/40; G06F 8/33
USPC ............................................................ 704/9
See application file for complete search history.

(56) References Cited

U.S. PATENT DOCUMENTS

| 6,314,559 | B1* | 11/2001 | Sollich ...................... G06F 8/33 |
| | | | 717/111 |
| 9,372,846 | B1* | 6/2016 | Perkov .................. G06F 40/211 |
| 11,113,186 | B1* | 9/2021 | Hussain .............. G06F 11/3664 |
| 2017/0332295 | A1* | 11/2017 | Sunay ..................... H04W 8/22 |
| 2018/0084338 | A1* | 3/2018 | Bostick .................. H04R 3/005 |

OTHER PUBLICATIONS

A. Arusoaie and D. I. Vicol, "Automating Abstract Syntax Tree Construction for Context Free Grammars," 2012 14th International Symposium on Symbolic and Numeric Algorithms for Scientific Computing, Timisoara, Romania, 2012, pp. 152-159, doi: 10.1109/SYNASC.2012.8. (Year: 2012).*
G. Fischer, J. Lusiardi and J. Wolff von Gudenberg, "Abstract Syntax Trees- and their Role in Model Driven Software Development," International Conference on Software Engineering Advances (ICSEA 2007), Cap Esterel, France, 2007, pp. 38-38, doi: 10.1109/ICSEA.2007.12. (Year: 2007).*

(Continued)

*Primary Examiner* — Bharatkumar S Shah
(74) *Attorney, Agent, or Firm* — Vista IP Law Group, LLP

(57) ABSTRACT

Disclosed is an approach to implement new behavior using natural language, and to debug and examine what happened in the past via a natural language interface as well. Some approaches use a combination of natural language understanding techniques, knowledge representation techniques, advanced compiler techniques and user interaction techniques, to solve for natural language programming and debugging of computers.

29 Claims, 47 Drawing Sheets

(56) References Cited

OTHER PUBLICATIONS

G. Fischer, J. Lusiardi and J. Wolff von Gudenberg, "Abstract Syntax Trees- and their Role in Model Driven Software Development," International Conference on Software Engineering Advances (ICSEA 2007), Cap Esterel, France, 2007, pp. 38-38, doi: 10.1109/ICSEA.2007.12. (Year: 2007) (Year: 2007).*
A. Arusoaie and D. I. Vicol, "Automating Abstract Syntax Tree Construction for Context Free Grammars," 2012 14th International Symposium on Symbolic and Numeric Algorithms for Scientific Computing, Timisoara, Romania, 2012, pp. 152-159, doi: 10.1109/SYNASC.2012.8. (Year: 2012) (Year: 2012).*
Yampolskiy, R., "Analysis of Types of Self-Improving Software," Computer Engineering and Computer Science Speed School of Engineering University of Louisville, USA, dated May 15, 2016.
Gulwani, S., et al., "NLyze: Interactive Programming by Natural Language for SpreadSheet Data Analysis and Manipulation," Proceedings of the 2014 ACM SIGMOD International Conference on Management of Data, Published Jun. 18, 2014.
Becker, K., "Using Artificial Intelligence to Write Self-Modifying/Improving Programs," Primary Objects, dated Jan. 27, 2013.
Reynolds, M., "AI learns to write its own code by stealing from other programs," dated Feb. 22, 2017, URL: https://www.newscientist.com/article/mg23331144-500-ai-learns-to-write-its-own-code-by-stealing-from-other-programs/#ixzz7Owg99tWM.
"Translating Natural Language to Code," transifex, dated Apr. 1, 2013, URL: https://www.transifex.com/blog/2013/translate-natural-language-to-code/.
Wiggers, K., "OpenAI launches Codex, an API for translating natural language into code," The Machine, dated Aug. 10, 2021.
Rahit, K., et al., "Machine Translation from Natural Language to Code using Long-Short Term Memory," dated Oct. 2019.
Lardinois, F., "Microsoft uses GPT-3 to let you code in natural language," TechCrunch, dated May 25, 2021.
Liu, X., et al., "From Natural Language to Programming Language," IGI Global, copyright 2018.
Clarke, L., et al., "Continuous Self-Evaluation for the Self-Improvement of Software," University of Massachusetts, date found via Google as Jul. 13, 2021.
Nair, H., "Building Alexa skills in Python, for absolute beginners," chatbotslife, dated Mar. 9, 2019.
Gonfalonieri, A. "How Amazon Alexa works? Your guide to Natural Language Processing (AI)," Towards Data Science, dated Nov. 21, 2018.
Young, J., "Amazon Echo: Create a Custom Voice Command," Smart Home Focus, dated Nov. 12, 2020.

* cited by examiner to create a person
```
var pointTextLocation = new paper.Point(50, 50)
var myText = new paper.PointText(pointTextLocation);
myText.fillColor = 'purple';
myText.content = "P";
myText._style.fontSize = 36
return myText
```

Fig. 5

```
// Now convert the className to data-paper-data so that paper can load it into data.
var $svg = $.parseXML(__proc.get_code()['procedure']['text'][0])
$.each($svg.all, function (i,e) {
   if (e.className && e.className.baseVal != "") {
      e.setAttribute('data-paper-data', JSON.stringify(
         {'class': e.className.baseVal}))
   }
})

paper.project.clear()
var reference = paper.project.importSVG($svg)

var kobj = (await E.concept(falsee, 'the', 'object')).reference({'ref': reference}).is_a('element')

// Now go through all nodes that have data-paper-data and declare the concepts
// for the caller to consume.
// TODO: handle nested children.
for (var e of paper.project.getItems({data: {}})) {
   if (e.data.class) {
      let get_fn, set_fn
      if (e.className == 'PointText') {
         get_fn = function(item) { return function() {return item.content} }(e)
         set_fn = function(item) { return function(val) { item.content = val } }(e)
      }
      var child = await kobj.ensure_child_with_reference(e.data.class,
         {'ref': e, 'get_fn': get_fn, 'set_fn': set_fn})

var class_name = e.data.class.split('_')
      class_name = class_name[class_name.length - 1]
      var class_cpt = await E.concept(false, 'a', class_name)
      class_cpt.is_a('element')
   }
}
```

Fig. 6

| Noun appearing in Clause of type ... | Is assigned the Field Type ... |
|---|---|
| Procedure | Procedure (if the noun is the object of the verb) |
|  | Query (if the noun is target of a preposition) |
| Query (also used for whose/which/who subclauses) | Query |
| FutureQuery | FutureQuery |
| Action | Action |
| Fact | Declarative (if the noun is receiving a replacement value) |
|  | Query (otherwise) |

Fig. 16

| Query | Start | middle | leaf |
|---|---|---|---|
| the <noun> | StackQueryInstance | | |
| the [Y's]+ <noun> | StackQueryInstance | If any ancestor is conceptual: QueryClass else: QueryInstance | If any ancestor is conceptual: QueryClass else: QueryInstance |
| a [Y's]* <noun> | QueryClass | QueryClass | QueryClass |
| all <nouns>['s Y]* | QueryInstance | QueryInstance | QueryInstance |
| any <nouns>['s Y]* | QueryInstance | QueryInstance | QueryInstance |
| <nouns>['s Y]* | X (needs "any" or "all") | | |
| <proper noun>['s Y]* | QueryInstance | If any ancestor is conceptual: QueryClass else: QueryInstance | If any ancestor is conceptual: QueryClass else: QueryInstance |

Fig. 17

| FutureQuery | Start | middle | leaf |
|---|---|---|---|
| the <noun> | StackQueryInstance | | |
| the [Y's]+ <noun> | StackQueryInstance | OptQueryInstance | OptQueryInstance |
| a [Y's]* <noun> | (converted to "any" noun) | | |
| all <nouns>['s Y]* | OptQueryInstance | OptQueryInstance | OptQueryInstance |
| any <nouns>['s Y]* | OptQueryInstance | OptQueryInstance | OptQueryInstance |
| <nouns>['s Y]* | X (needs "any" or "all") | | |
| <proper noun>['s Y]* | QueryInstance | OptQueryInstance | OptQueryInstance |

Fig. 18

| Declarative | Start | middle | leaf |
|---|---|---|---|
| The [<adj>]* <noun> | StackDeclareFactInstance | | |
| the [Y's]+ <noun> | StackQueryInstance | If any ancestor is conceptual or RHS is code:<br>  DeclareClass<br>Elif singular:<br>  DeclareInstance<br>Else:<br>  QueryInstance | If any ancestor is conceptual or RHS is code:<br>  DeclareClass<br>else<br>  DeclareInstance |
| a [Y's]* <noun> | DeclareClass | DeclareClass | DeclareClass |
| all <nouns>['s Y]* | X (drop "all" to make it declarative) | | |
| any <nouns>['s Y]* | X | | |
| <nouns>['s Y]* | DeclareClass | DeclareClass | DeclareClass |
| <proper noun> | DeclareInstance | | |
| <proper noun>['s Y]+ | DeclareInstance | If any ancestor is conceptual or RHS is code:<br>  DeclareClass<br>Elif singular:<br>  DeclareInstance<br>Else:<br>  QueryInstance | If any ancestor is conceptual os RHS is code:<br>  DeclareClass<br>else:<br>  DeclareInstance |

Fig. 19

| Action | Start | middle | leaf |
|---|---|---|---|
| the <noun> | StackDeclareInstance | | |
| the [Y's]+ <noun> | StackQueryInstance | QueryInstance | DeclareInstance |
| a <noun> | StackDeclareInstance | | |
| a [Y's]+ <noun> | StackQueryInstance | QueryInstance | DeclareInstance |
| all <nouns>['s Y]* | QueryInstance | QueryInstance | QueryInstance |
| any <nouns> | X (later we will support random or user-assisted choice) | | |
| <nouns>['s Y]* | X (needs "all"/"any"/"the") | | |
| <proper noun> | QueryInstance | | |
| <proper noun>['s Y]+ | QueryInstance | QueryInstance | DeclareInstance |

Fig. 20

| Procedure | Start | middle | leaf |
|---|---|---|---|
| the <noun> | StackQueryInstance | | |
| the [Y's]+ <noun> | StackQueryInstance | If any ancestor is plural or conceptual: DeclareClass else: QueryInstance | If any ancestor is plural or conceptual: DeclareClass else: QueryInstance |
| a [Y's]* <noun> | DeclareClass | DeclareClass | DeclareClass |
| all <nouns>['s Y]* | X (just drop "all") | | |
| any <nouns>['s Y]* | X (replace "any" with "a") | | |
| <nouns>['s Y]* | DeclareClass | DeclareClass | DeclareClass |
| <proper noun>['s Y]* | QueryInstance | If any ancestor is plural or conceptual: DeclareClass else: QueryInstance | If any ancestor is plural or conceptual: DeclareClass else: QueryInstance |

Fig. 21

```
def invite(person, msg):
    send(msg, person)

invite("John", "welcome")
```

Fig. 22

To invite a person with a message
Send the message to the person

Invite John with "welcome" message

Fig. 23

Invite John with "welcome" message
Send "welcome" to John

Fig. 24

```
[
  "action_predicate",
  {
    "predicate": {
      "verb": {
        "simple": "move",
        "adverbs": "continuously"
      },
      "object": [
        "determinant_name",
        "the",
        "circle",
        null
      ]
    }
  }
]
```

Fig. 26

METHOD, SYSTEM, AND COMPUTER PROGRAM PRODUCT FOR NATURAL LANGUAGE PROGRAMMING OF A NEW FUNCTION OR SKILL

CROSS-REFERENCE TO RELATED APPLICATIONS

The present application claims the benefit of priority to U.S. Provisional Application No. 63/105,176, filed on Oct. 23, 2020, which is hereby incorporated by reference in its entirety.

BACKGROUND

Natural language processing (NLP) refers to a field in computer science that permits a computing system to understand and/or act upon inputs, whether spoken or text, which are provided in a language that humans would typically use to interact with another human. This is in contrast to non-natural language processing approaches where, for example, a specialized programming language (a "native" language) such as Java or C is used to "code" specific behaviors into a computer system.

Today, many natural language processing systems are emerging in commonly available commercial devices and systems. For example, Alexa, Siri, Cortana, and Google home all allow for simple natural language instructions to be given, and for a computer or other device to execute those instructions.

One drawback with known systems is that any desired function or skill sought by a user can only be performed if the requested function or behavior has already been programmed into the system. Any requested function or behavior not already programmed into the system will not work or be understood by the system.

When it becomes known that the system cannot process a desired function or skill, a not-insignificant amount of effort is needed to then program the desired behavior into the known systems. To build a new function into the known systems, a programmer is typically needed to develop the new functionality using a programming language. For example, a new skill in conventional natural language processing systems is typically constructed using a traditional programming language like Java or Python.

Non-programmer approaches may also be used to construct new functionality, where there are tools that can be used by non-programmers to change and program new computer behaviors, e.g., where such tools may be referred to as low code/no code tools. Much of the time, these tools are delivered in the form of a drag-drop console where widgets that process data or exhibit behavior are joined together in a flow-chart creating a visual representation of the workflow.

However, these approaches all still require a human user to engage in some form of manual effort to create and "program" new behaviors into the system, and the success or failure of the new behavior is entirely reliant upon the experience, knowledge, and design skills of the human user. In many cases, the high learning curve and experience needed for a human to become proficient enough to think about all the corner cases in an up-front manner makes it difficult if not impossible for most individuals to be able to create error-free and fully functional programming for a processing system, whether by writing software or using non-programmer tools.

What is needed, therefore, is an improved technological approach that overcomes the problems when a desired function or behavior does not currently exist or behave properly in a computing or processing system.

SUMMARY

Some embodiments of the invention solve the above-described problems by providing mechanisms for both the ability to program new behavior using natural language, and also, the ability to debug and examine what happened in the past via a natural language interface as well. These capabilities do not exist in the state of the art today.

Some embodiments use a combination of natural language understanding techniques, knowledge representation techniques, advanced compiler techniques and user interaction techniques, to solve for natural language programming and debugging of computers.

Some embodiments pertain to a method, system, or computer program product for operating a software application that utilizes an interface to receive commands from a user; receiving a command during the execution of the software application for functionality that is not programmed into the software application; fetching logic corresponding to the functionality; and implementing the logic by the software application for the software application to learn the functionality, wherein natural language is used through the interface to implement the logic.

Some embodiments pertain to a method, system, or computer program product for operating a software application that utilizes an interface to receive commands from a user; receiving a command during the execution of the software application for functionality that is not programmed into the software application; fetching logic corresponding to the functionality; and implementing the logic by the software application for the software application to learn the functionality, wherein the logic is implemented by the software application during runtime.

Some embodiment pertain to a method, system, or computer program product for operating a software application that utilizes an interface to receive commands from a user; receiving a command during the execution of the software application for functionality within the software application; identifying an edge case or exception for the functionality; receiving human input to address the edge case or exception; and during runtime of the software application, implementing logic corresponding to the human input to address the edge case or exception, wherein the logic implemented in the software application reduces the need for future human input for future edge cases or exceptions. The software application may resume after addressing the edge case or exception.

Some embodiments may operate where the logic is implemented by the software application during runtime. In addition, the logic can be implemented during runtime by a process comprising: without exiting from the current execution of the software application: identifying a knowledge graph associated with the software application, wherein the knowledge graph comprises information for procedures performed by the software application; updating the knowledge graph to include a new procedure associated with the logic for the functionality; and wherein the software application continues its currently executing runtime to execute the functionality by: querying the knowledge graph to identify the new procedure for the functionality; and implementing the user command by running the new procedure.

Some embodiments may provide for a question and response interface to use the natural language to implement the logic in the software application. Some embodiments may perform a search of an external knowledgebase for the logic, and the logic is fetched from the external knowledgebase to implement in the software application. In some embodiments, a value is unknown during runtime of the software application, and the logic is used to compute the value, wherein the value is set to continue execution of the software application. In some embodiments, the software application requests information from a human user to fetch the logic. In some embodiments, the software application performs at least one of: (a) skip a current instruction and continue; (b) rewind to a same or a previous statement in program logic and retry; (c) replace the current instruction with one or more new instructions and continue.

In some embodiments, a delegation is performed from a first source of knowledge to a second source of knowledge for the logic, e.g., where the first source of knowledge or the second source of knowledge may be selected from at least one of a human or an automated system. Any one or more of following may be used to provide the logic: a human, an automated system/machine/knowledgebase, a learning service is used to provide the logic, and/or crowdsourcing is used to provide the logic.

In some embodiments, natural language is processed by analyzing words and symbols in the natural language to create an abstract syntax tree (AST). A word or an action in the AST can be resolved to a knowledge graph. The action can be resolved to a procedure in the knowledge graph, wherein the procedure is run to execute the command or wherein the procedure is defined using the natural language. An environment parameter can be used to resolve the word or action.

Some embodiments pertain to a method, system, or computer program product for operating a software application comprising both a natural language portion and a native language portion; receiving a command from a user through the natural language portion of the software application with a first parameter; the natural language portion updates a knowledge graph with the first parameter before invoking the native language portion; invoking the native language portion to perform the command, wherein native language portion looks up the knowledge graph to retrieve the first parameter; determining that the native language layer needs a second parameter that was not passed through by the natural language portion to execute the command; and upon determining that the second parameter is needed, the native language portion looks up an external program/service or asks a human for the second parameter. The native language procedure can be used to invoke a special function to retrieve parameters. The special function is operable to first look up a knowledge graph for the parameter and then the special function looks up an external program/service or asks a human for the parameter. The native language procedure may get access to parts of speech concepts in natural language by looking up using special names for at least one of 'subject', 'object', or 'preposition'.

Some embodiments pertain to a method, system, or computer program product for operating a software application that utilizes natural language; executing functionality within the software application using an interpreter or a compiler; and generating a natural language trace for execution of the functionality, wherein the natural language trace provides a step-by-step sequence of actions in a natural language format without requiring a programmer to manually insert a statement for printing or logging the tracing statement in the natural language format. The software application may utilize a natural language interface to receive commands from a user.

Some embodiments pertain to a method, system, or computer program product for implementing a language-based programming system; defining a procedure in the language-based programming system; determining if a concept satisfies an adjective in the procedure; using the adjective in a natural language sentence in a natural language program. A knowledge graph can be queried to check whether a procedure exists to determine whether the adjective corresponds to the concept. An interpreter can be used to run the procedure to determine whether an object satisfies the adjective. The language-based programming system may correspond to either a natural language system or a native language system.

Some embodiments pertain to any combination of the above-described elements and/or any other element or concept described in this document or attached figures.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 illustrates an approach by which a procedure body can register new concepts with an optional reference to the underlying representation.

FIG. 6 illustrates a helper method.

FIGS. 16-21 illustrate tables of actions for handling parts of speech such as nouns.

FIG. 22 shows a sample computer program written in Python.

FIG. 23 shows a sample computer program written in natural language.

FIG. 24 illustrates a trace.

FIG. 26 shows a structured sentence (AST) that can be derived from that natural language statement.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Humans have for a long time used mathematical constructions to program new behavior in computers. Many computer languages have been derived from lambda calculus and are mathematical in nature. The act of programming new behavior in a computer is tantamount to writing computer code in a rigid grammatical structure. Hence, programming computers has required skills that only a few are able to acquire.

On the other hand, instructing human assistants to perform a new task is usually done in natural language. This skill is natural to humans and most humans know how to instruct another human to follow a prescribed procedure.

Embodiments of the invention provide an inventive approach to use natural language to program new behavior in computers. This approach therefore does not require manual programming to implement a new function or behavior into a computing or processing system. Instead, this approach will now advantageously open up myriad possibilities for human computer interaction and make all humans programmers of computers at some level.

Figure 1:
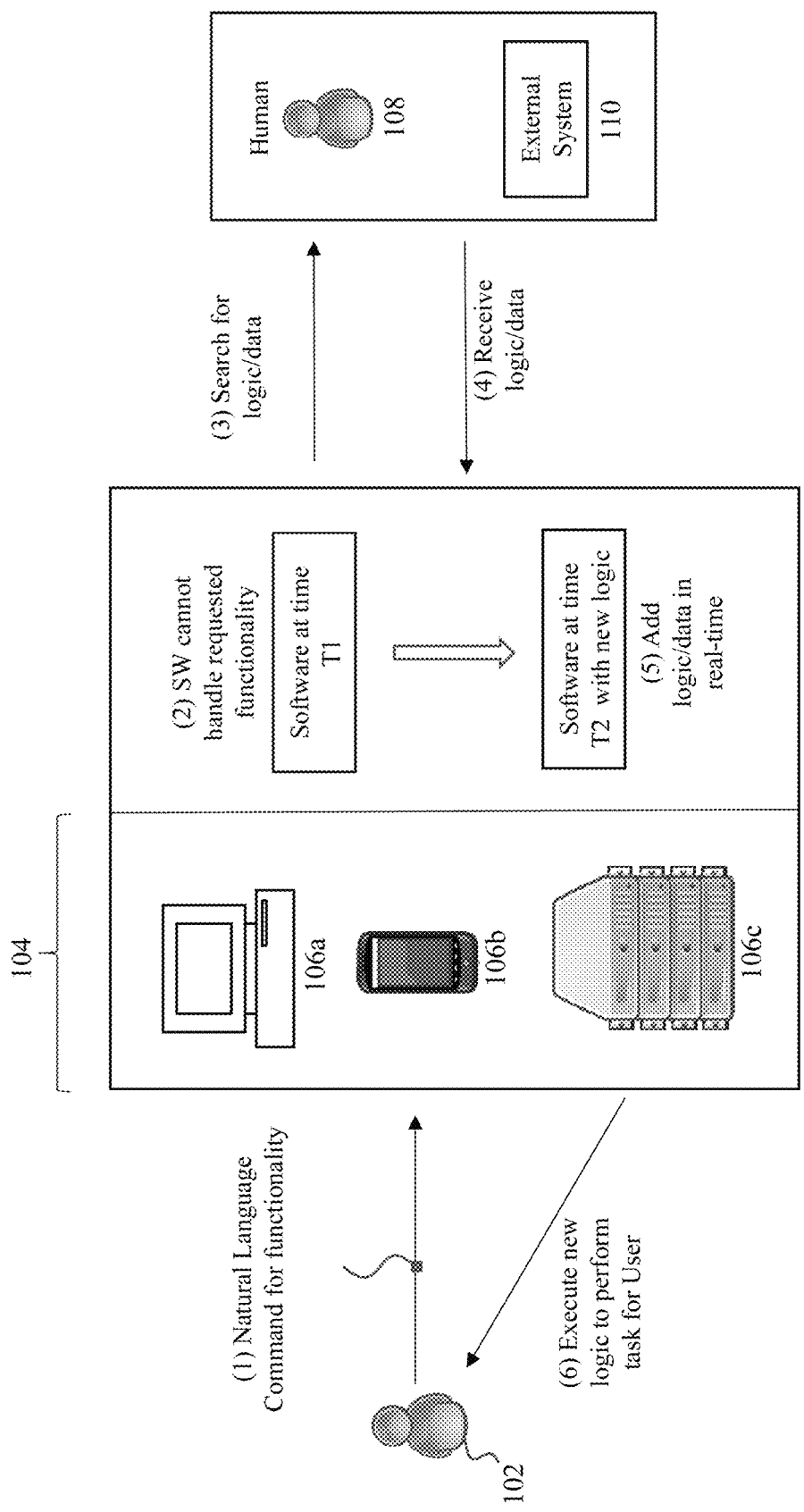
FIG. 1 provides a high-level illustration of an approach to implement some embodiments of the invention.

FIG. 1 provides a high-level illustration of an approach to implement some embodiments of the invention. At (1), a human user 102 may use a natural language to provide an instruction to a processing device 104. The processing device 104 comprises any type of computing or processing device/user station that may be used to implement, operate, or interface with the user 102 to perform a computing or processing task. Examples of such devices include, for example, personal computers 106a, mobile devices 106b, servers 106c, or any other type of suitable device such as personal assistants, tablets, smart wearables, nodes, or computing terminals. The processing device 104 may comprise a display device, such as a display monitor, for displaying a user interface to users at the user station, and a speaker for voice communication with the user. The processing device/user station may also comprise one or more input devices for the user to provide operational control over the activities of the system, such as a microphone to receive voice inputs, or a mouse or keyboard to manipulate a pointing object in a graphical user interface to generate user inputs. The processing device 104 may be communicatively coupled to a storage apparatus (e.g., a storage subsystem or appliance) over a network. The storage apparatus comprises any storage device that may be employed by the system to hold storage or executable content.

At (2), an attempt is made using software operated by the processing device 104 to process the user command. At this point, consider if the software operated by the processing device is unable to handle or process the input by the human user. This may occur, for example, because the requested functionality is just completely missing from the logic built into the software. In other words the programmer that wrote the software did not write programming code to implement the desired functionality, perhaps because the programmer did not anticipate that a user would request that functionality.

Another possible reason for the software to fail to process the user input is because of an error or exception that occurs during processing, e.g., where the software is operated with wrong data or a wrong procedure. Both humans and machines will get a bad result if they were given wrong data or a wrong procedure to begin with. However, once a machine gets a bad result, there is generally no easy way for redoing the task with the fixed data or logic. Humans will discover the bad data or logic, then learn what the right data or logic should have been and then redo the portion of the task that needs to be tried again to get to the right result.

Another class of problems that may arise pertains to environmental failures. A human when presented with an environmental failure (say the house loses power, or the internet connection goes down), will pause doing the task they were doing, fix the environmental issue, and then resume the task they were working on originally. The logic for fixing the environmental issue need not be part of the procedure that they were working on. It is injected in an ad hoc manner to handle the unexpected event of the failures in the environment. Computing systems behave differently. If the environment failure was not expected and handled in the given logic in the program being run, the program will simply crash. There is no way for the program to wait and have a human or another program fix the environmental issue allowing the original program to resume.

These stark differences between how machines and humans behave when faced with problems is the fundamental reason why programming is a skill that requires training and only a relatively small fraction of humans have the training or experience to be able to effectively program machines. The programmer is forced to think up-front about all the above classes of errors and either make sure that these errors do not happen or write logic to gracefully handle these errors when and if they happen. It is not a trivial task to make sure that a computer program specify logic in an up-front manner that can handle all unexpected scenarios. This realistically limits the art of good programming to only highly experienced and skilled programmers.

As is evident, one main difference between computers and humans is that in most cases computers have to be instructed up-front what to do, while humans can learn "on-the-job", especially when a problem occurs while performing a task. For example, when performing a task, if a human realizes that some data is missing, the human turns to someone who might have the missing data, and learns the new data and continues doing the task. Computing systems will crash in such a situation unless the developer a priori writes logic to handle the unexpected case. Similarly, when a human is doing a task and realizes that they do not know how to do something, they ask someone who can teach them the skill, they learn and then continue. A computing system may present a compile error and refuse to start doing the task, or worse will crash in the middle of a running task with no recourse to learn on the job.

With embodiments of the invention, the processing device is configured to "learn" how to address the above-described problems, similar to the way that a human would tackle such problems and unlike any existing software paradigm for handling such problems. In particular, the current inventive embodiments provide systems and methods that address the above problem(s) and exhibit human-like error handling in computing systems. Therefore, at (3), the inventive embodiment will search for and learn the appropriate logic and/or data that is needed to address the identified problem that the current software is having with being able to process the user command. Some or all of the following may be addressed: (a) Missing Data; (b) Missing Logic; (c) Wrong Data; (d) Wrong Code; (e) Unexpected Situation; and/or (f) Incomplete code, Each of these solutions will be described in more detail below.

The process of learning the solution may cause the system to receive information from any suitable source. For example, at (4), the new logic or data may be received from a human 108 or any external computing system 110. The external system may comprise any machine-based source of information, such as a website, knowledgebase, database, or the like.

At (5), the software will learn the new behavior during its current runtime. This means that the software will add the new logic or data while it is still running, and will continue to operate without exiting from or stopping its current execution. At (6), the modified software will then use the new logic/data to perform the originally requested task from the user.

In some embodiment, the system allows for code to change during runtime if the user so prefers. In traditional computer languages, it is not possible to pass a new parameter to a called procedure during runtime because adding a new parameter requires the source code to change in both the calling and called procedure. This makes it hard to build a system that can allow such changes at runtime. However, in some embodiments of the current invention, it is possible for a called procedure to obtain an unforeseen parameter at runtime. This is possible because the calling procedure is not mandated to provide all the parameters when calling the called procedure. The called procedure has the ability to pull parameters on its own accord from the knowledge graph or the user without having to change anything in the calling procedure. This provides tremendous flexibility to change code on the fly. Further, given that the system does not crash but rather asks the user anytime it needs some clarification (like confusion between two items with the same name, like two Johns, or two ways to send, etc), the system further lends itself well to runtime adaptation without having to start from the beginning as many computer systems require.

Figure 2:
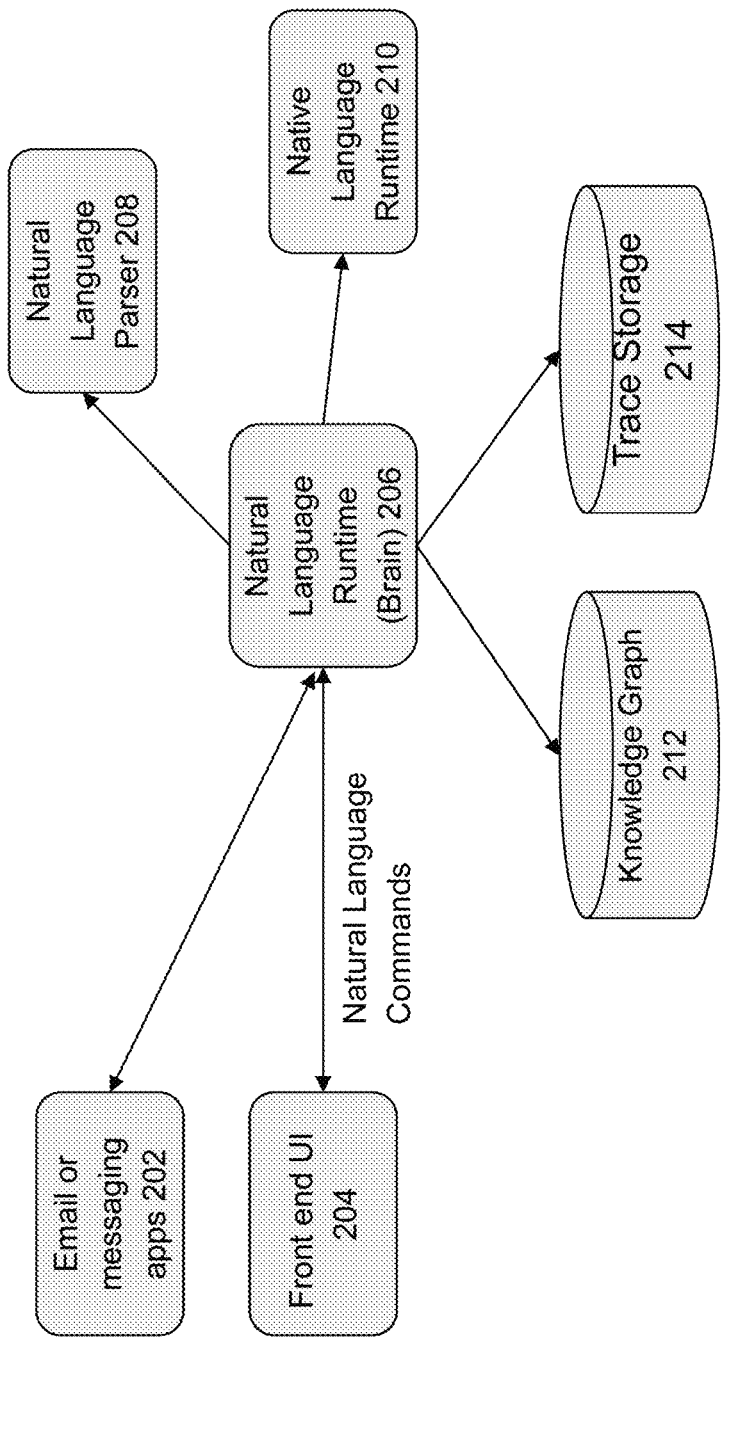
FIG. 2 provides an illustration of a system architecture for implementing some embodiments of the invention.

FIG. 2 provides an illustration of a system architecture 200 for implementing some embodiments of the invention. The system 200 includes both a natural language runtime 206 and a native language runtime 210. The natural language runtime 206 performs processing on the basis of natural language processing inputs. The native language runtime 210 performs processing on the basis of computer code that is written to run "natively" in the system. Native languages are traditional computer programming languages such as, for example, Javascript, Python, Java.

The system 200 includes a knowledge graph 212 that can represent facts, procedure and rules. The knowledge graph 212 is a searchable entity that is capable of being queried to identify entries that are stored within the graph. The knowledge graph 212 in some embodiments is constructed with the understanding of inheritance and thus, when taught that "a dog is a mammal" and "Tony is a dog", understands that "Tony is a mammal".

In operation, a front end user interface 204 is employed to receive natural language commands into the natural language runtime 206. Additional inputs may be received via other applications 202, such as email or messaging applications. A natural language parser 208 may be used to parse the natural language inputs received from the front end UI 204 or the email or messaging applications 202.

The natural language runtime ("brain") 206 and the native language runtime 210 operate in conjunction with one another to process the user commands. For example, as described in more detail below, parameters may be passed through the knowledge graph 212 between the natural language runtime 206 and the native language runtime 210 to execute the user command.

The system 200 may also include storage 214 (e.g., a short term memory) where it holds a running context of what is performed in the system, e.g., for tracing purposes. In some embodiments, that context includes all commands run, facts observed, and entities resolved. The context also keeps track of asynchronous tasks that are marked with words like "whenever, while, continuously, after 10 seconds, tomorrow, every week, every alternate day, every second Monday of February", etc. Under the context of each asynchronous task, the system remembers the time stamp of each time it was invoked and the details of each statement run and the result, if any, obtained.

Figure 3:
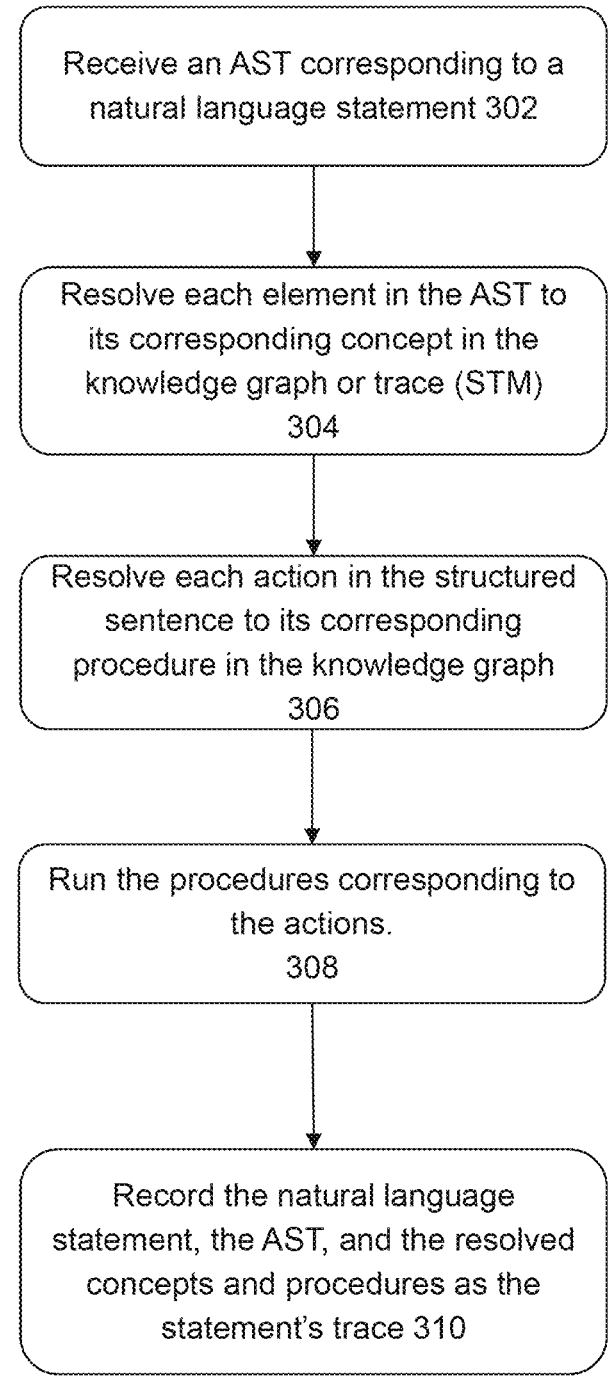
FIG. 3 shows a flowchart of an approach to process natural language according to some embodiments of the invention.

FIG. 3 shows a flowchart of an approach to process natural language according to some embodiments of the invention. The processing generally proceeds by analyzing the words and symbols in a natural language statement. At 302, the processing receives an abstract syntax tree (AST) that corresponds to the natural language statement. The AST can be generated based on the technique described herein. The natural language text is processed to determine the role of each word and symbol in the statement. This is done in some embodiments by using a neural network trained to do so using any of the common AI-based classification techniques. The AI ('artificial intelligence") models are trained on not only English statements but also statements that include or are completely comprised of mathematical phrases like "1+1", "john's age*2", "the answer", "add 2*log(100) to the bank account". The AI parser outputs the roles of each word and symbol in the statement, which proceeds to the next phase.

The statement with the annotated roles of the words and symbols are processed and converted into the abstract syntax tree that captured the structure of the statements in terms of the traditional grammatical constructs like subject, predicate, object, verb, adjective, adverbs, prepositions, etc. The AST captures the structure of the English (or for that matter any natural language) statement.

One such example of a tree is the traditional 'sentence diagramming' as taught in the English grammar book 'Rex Barks'. However, other equivalent structures can be used. One can use a structure that captures not only the parts of speech, but also the type of sentence as well as the semantic operations required to resolve the concepts in the sentence. For example, "any of the scene's bricks" is translated to:

```
"any",
[ "possessive",
  [ "determinant_name",
    "the",
    "scene",
    null
  ],
  { "members": "bricks" }
],
```

The AST supports different types of natural language statements like declarative, interrogative and imperative/procedural.

Declarative statements usually provide a piece of knowledge that the system represents in a knowledge graph of concepts. Each concept can have inbound and outbound relations to other concepts. The relations between the concepts in the knowledge graph can be "is a", "is name of", "corresponds to", or any regular relation typically encountered in natural language ("brother of", "car of", etc.) or in relational databases. The concepts can optionally have a value ("john's age is 21"). Declarative statements update the knowledge graph using relations between concepts and values stored within concepts. Some declarative statements define how to compute things. For example, "a number's square root is . . . " is the start of a declarative statement that defines how to find out the square root of any number. Such statements create conceptual nodes in the knowledge graph that are referred to when those kinds of entities need to be evaluated. Note that the procedure to evaluate an entity can be given in either English ("a number is odd if the number is not even") or in a standard computer language like javascript. Some declarative statements define how to do things, For example, "to send a message to a person . . . ". This statement is the start of a procedure that defines how to send a message to a person. This is stored in a conceptual node in the knowledge graph and invoked when a concept action like "send 'hello' to John" is called, where the system knows that 'hello' is a message and John is a person.

Interrogative statements essentially traverse the knowledge graph that was created as a result of declarative statements and present the answer to the user.

Imperative statements execute actions and are processed to find out the verb and the associated objects, prepositions, adjectives, etc. Then, all the known procedures that match the classes of the concepts are examined to find the best match. That matched procedure is then executed with the given concrete concepts. For example, "a friend is a person. John is a friend. send the shop's summary to John" resolves into the verb "send" that acts on "the shop's summary" which is of the class 'string' and the prepositional object is John who is of the class friend, which in turn is of the class person. All known procedures that agree with the class of the concepts in the imperative statement are examined and the closest match is executed. If there is a confusion as to which one to run, the user is given the choice to pick the one to run. A procedure in turn can be a collection of statements which are processed sequentially according to the method described above. The collection of statements could also be in a native computer language, in which case the set of statements are run using a standard interpreter for those languages.

At 304, nouns within the AST are resolved to the knowledge graph. For example, the nouns within the AST can be resolved to its corresponding concept within the knowledge graph and/or trace. At 306, actions within the AST are resolved to the knowledge graph. For example, each action in a structured sentence within the AST can be resolved to its corresponding procedure within the knowledge graph.

There is the notion of environments that is key to the selection of both data from the knowledge graph as well as procedures from the knowledge graph. For example, the system can be programmed to do the same task in different ways in different environments. Environments can be temporal or spatial. For example, "while in India, to order lunch . . . " versus "while in America, to order lunch . . . ". Here, 'while in India/America' is the environment. In both environments, the same procedure "to order lunch" has been defined. The system can be informed that it is in an environment via a simple statement like 'you are in India". That allows the system from then on until it exits the environment, to choose both facts and procedures that are relevant to the environment.

At 308, the processing will thereafter run the procedures that correspond to the actions. At 310, recording is performed of information pertaining to the execution of the procedures. For example, the system may record the natural language statement, the AST, and the resolved concepts and procedures as the statement's trace.

With regards to procedures, it is noted that the procedures can be defined with a natural language name or header. In some embodiments, there are no function names or formal arguments as in traditional computer languages. The body of the procedure can itself be in natural language or can be in any of the traditional computer languages.

Figure 4:
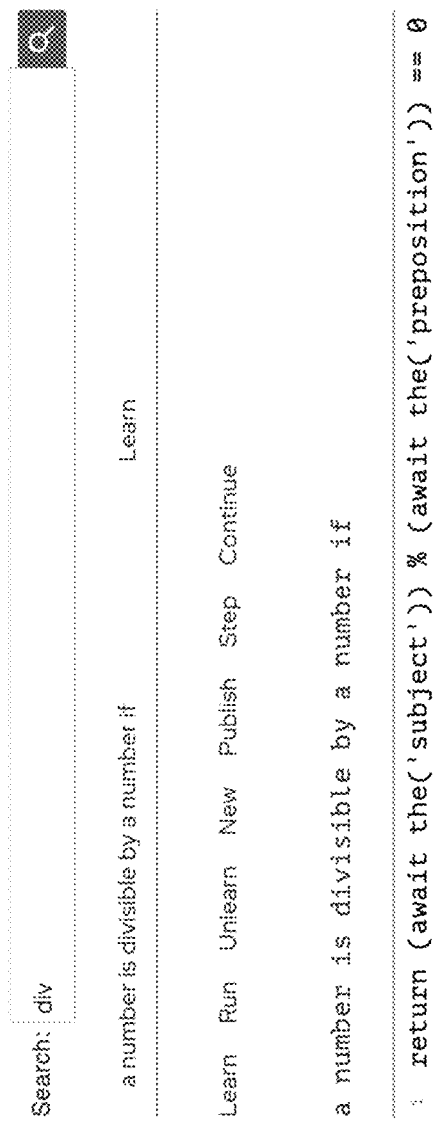
FIG. 4 shows an example of a procedure with a javascript body.

An example of a procedure with a javascript body is shown in FIG. 4. Here, the javascript or any other language body accesses the parameters of the procedure call via parts-of-speech access methods. They can also access parameters or other entities in the call-stack context via the named entities like: "await the ('number')" or "await the ("cars")". These access methods are very flexible and allow for accessing potentially all of the knowledge graph by using traversal routines.

There are also methods by which the procedure body can register new concepts with an optional reference to the underlying representation. An example of this shown in FIG. 5. Here, the javascript routine creates an entity in memory and returns it. The reference to myText is then kept in the knowledge graph as an external reference that is made available to the lower programming layer anytime the same 'person' is accessed by the lower layer. This allows for a clean separation of the English and non-English programming paradigms while allowing for reference passing between the two layers across time and space.

A new concept with a reference can also be explicitly created with a helper method as in the "var kobj . . . " statement in FIG. 6. There is another instance in FIG. 6, where "kobj.ensure_child_with_reference ( . . . )" is creating a child of an existing concept in the knowledge graph but also provides a reference (ref) and get (get_fn) and set (set_fn) functions for manipulating the value of what the reference points to.

Figure 7:
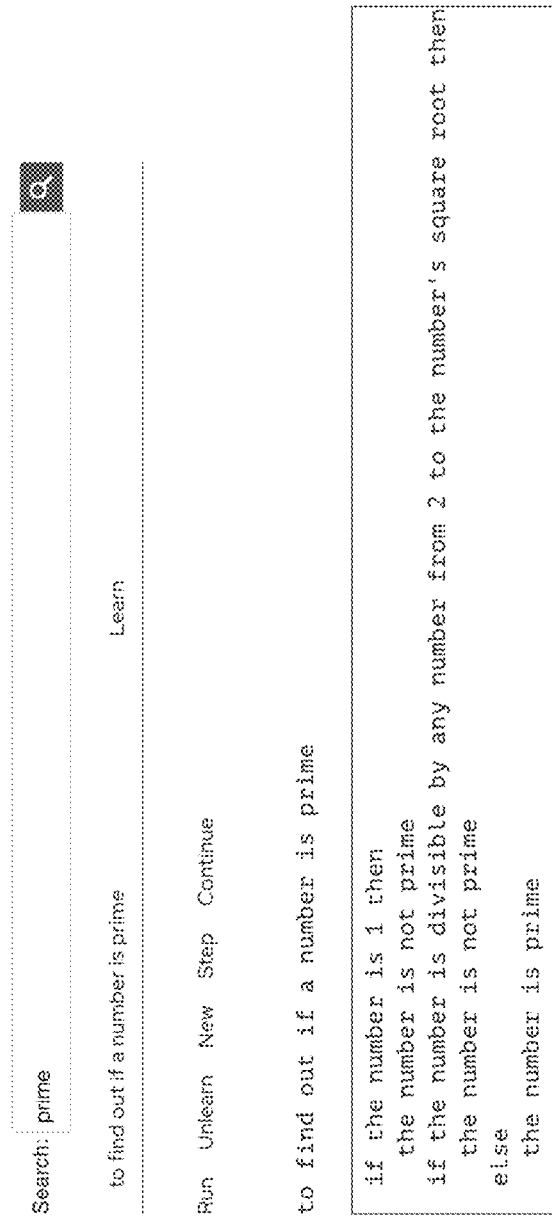
FIG. 7 illustrates an example of a procedure with an English body.

An example of a procedure with an English body is shown in FIG. 7. Note that other than indentation that provides clarity of which statements to run in the "if" and the "else" sections of the logic, there is not any punctuation, symbols or syntax to worry about for the user who writes the natural language code.

As previously noted, one of the problems in conventional automation is that when any piece of automation hits an error, unless the developer had foreseen the error condition and has provided error handling code, the automation simply "crashes". This is very different from how intelligent beings like humans or even animals behave. Intelligent beings get "stuck" on hitting unforeseen conditions and wait for help. This particular behavior has not been possible in computer science so far.

Figure 8:
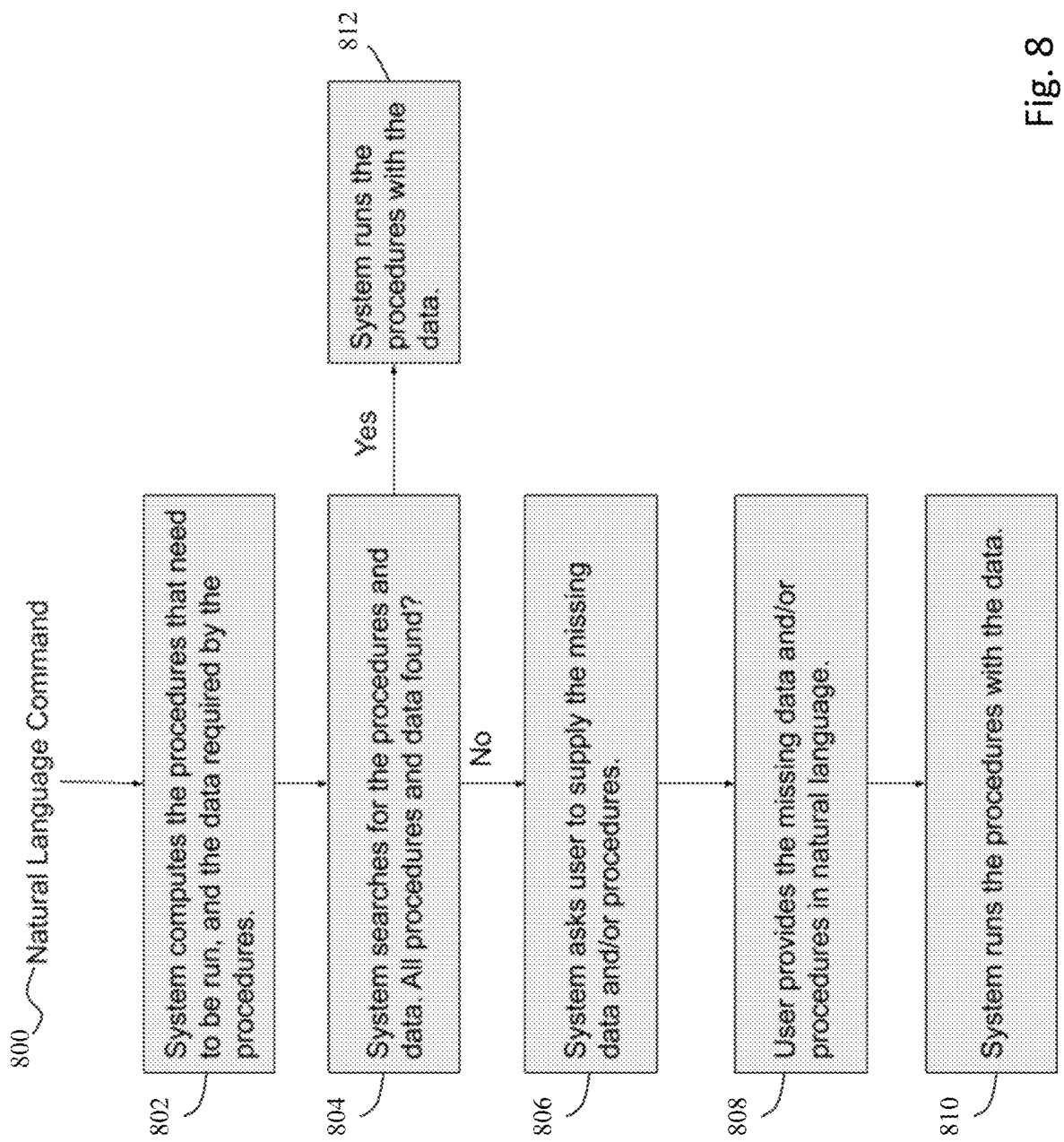
FIG. 8 provides a flowchart of an approach to resolve missing data or a missing procedures according to some embodiments of the invention.

FIG. 8 provides a flowchart of an approach to resolve missing data or missing procedures according to some embodiments of the invention. The processing begins when a natural language command 800 is received into the system. At 802, the system makes a determination of the procedure that is needed to be run and/or the data required by the procedure. This action may be performed, for example, by searching the knowledge graph for the pertinent procedure or data.

At 804, a determination is made whether the required procedure and/or data has been found. If found, this means that the system has the requisite content (logic or data) to perform the requested user command. The requisite content may have been coded into the system by a developer, or may have been included into the system by a prior iteration of the current process based upon a prior user command. Regardless, if the required procedure/data is found, then at 812 the system runs the procedure with the data to execute the functionality needed to handle the user's natural language command.

If the required procedure and/or data is not found, then the processing continues to acquire the necessary procedure or data. The procedure or data may be acquired in any suitable manner. The process may be based upon an automated search of a secondary source, or based upon a request to a user to supply the missing content. In the embodiment of the current figure, at 806, the system asks a user to supply the missing data and/or procedure. At 808, the user provides the missing data and/or procedure in natural language. The system, at 810, can then run the procedure with the data.

Figure 9A:
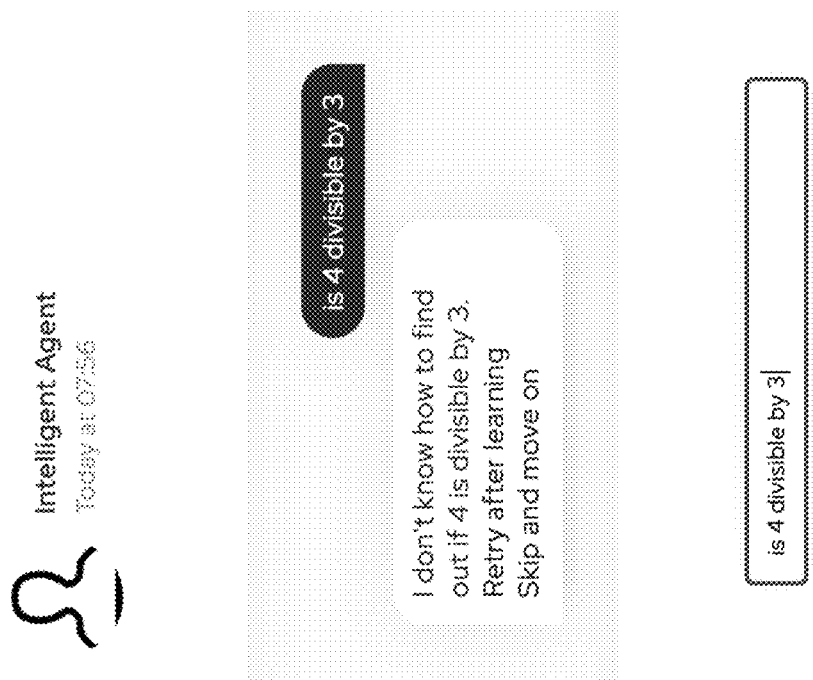
FIGS. 9A-G illustrates an example of how a system asks the user to supply missing information.
Figure 9B:
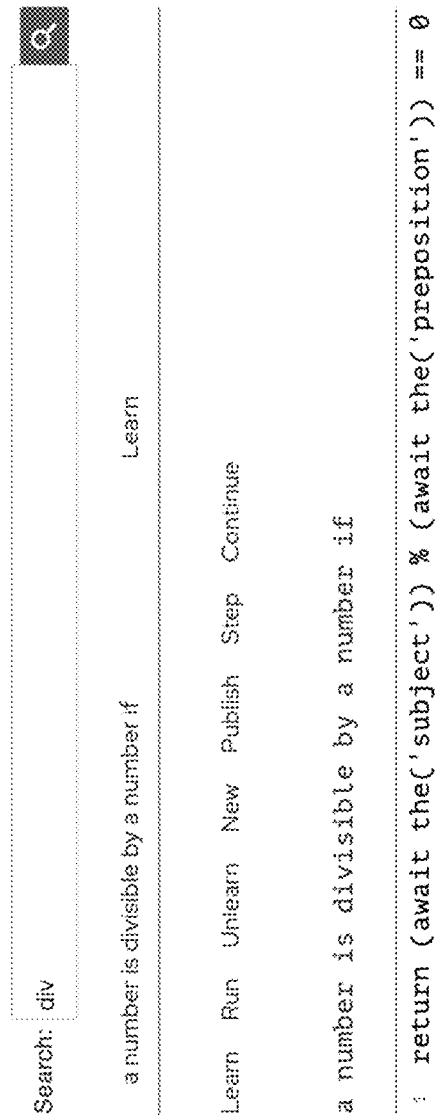

An example of how the system asks the user to supply missing information is shown in FIGS. 9A-G. These figures provide an illustration of a situation where the user is requesting the system to determine if a number is divisible by another number. As shown in FIG. 9A, the system provides a response indicating that the system does not yet have enough knowledge to perform the requested task. As such, the system can ask the user to teach it the skill. As shown in FIG. 9B, the user either types in the procedure or searches for the procedure in a collection of skills and playbooks available in one or more central repositories (hosted publicly or privately in an enterprise). The user then instructs the intelligent agent to learn the skill, e.g., by pressing the 'Learn' button in the user interface. In one embodiment, the act of searching for the matching skill and learning can be automatic (e.g., where the author of the skill was pre-approved or trusted by the user).

Figure 9C:
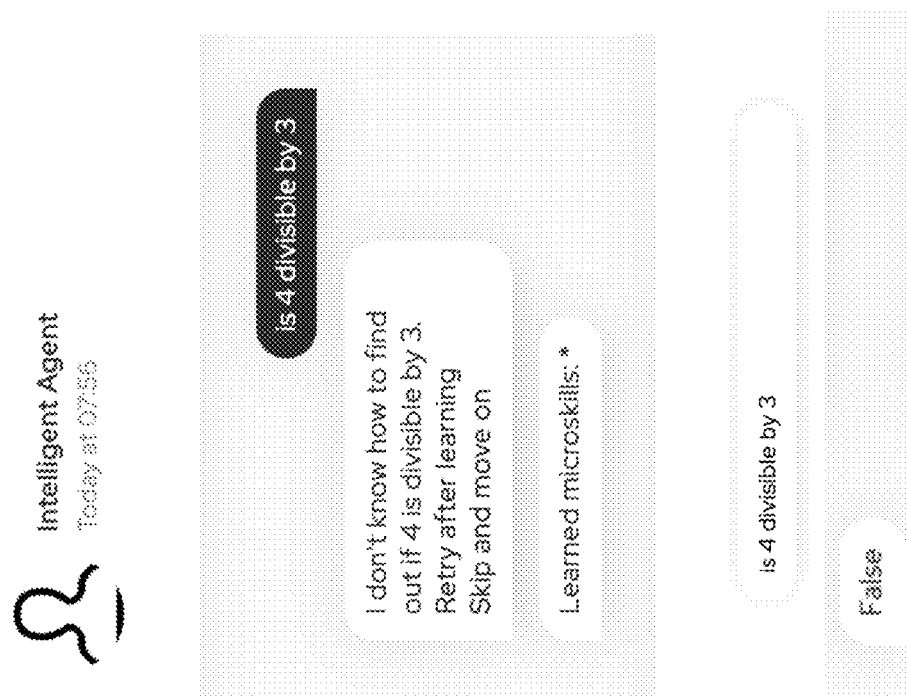

As shown in FIG. 9C, the intelligent agent indicates that it has learned the new micro-skill. After the intelligent agent has learned how to compute what was required it continues with the job without having to restart, and prints the answer "False" correctly to the problem it was trying to solve: "is 4 divisible by 3". Subsequently, the agent is automatically able to apply the skill to a list of numbers and further understands how to process 'and' vs. 'or' in a list of options. This is achieved by applying the single object case multiple times and then based on whether it is and/or/at least <num>/at most <num>/etc determining what the answer should be. This is shown in the interaction with the agent in FIG. 9D.

Figure 9D:
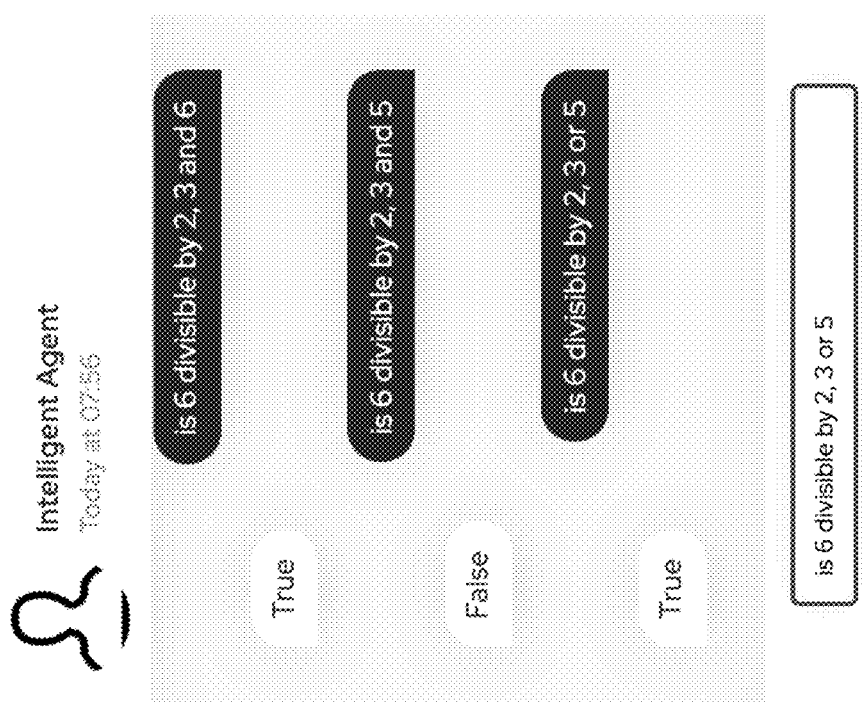
Figure 9E:
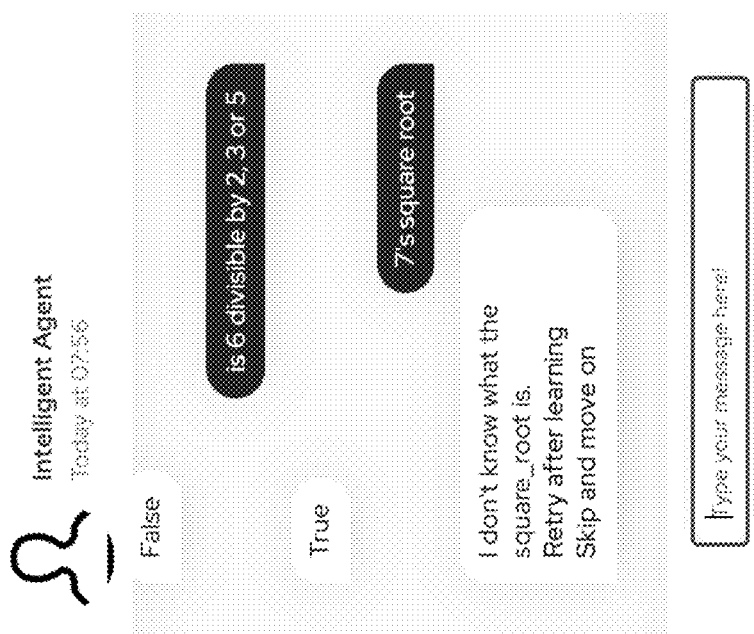
Figure 9F:
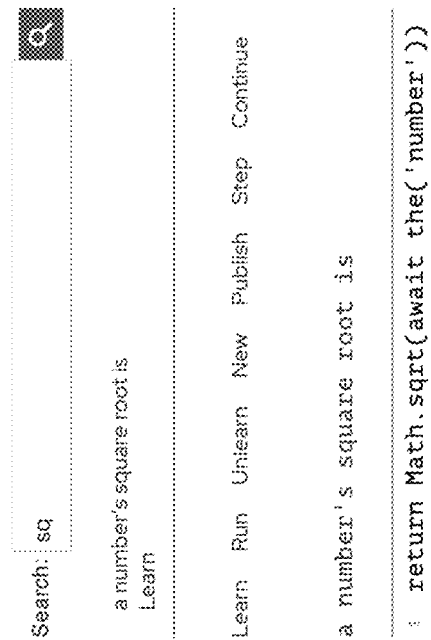

As another example, assume that the user proceeds to ask the system to answer a question such as the square root of a number, e.g., as shown in FIG. 9E. If the system knows how to evaluate that, then it will report the answer; otherwise, it will ask the user to teach it how to handle the requested functionality. The user can also ask the system to simply skip the action and move on. The user then either types in, dictates using text-to-speech, or searches a central repository for a matching procedure to do the job as shown in FIG. 9F. The system can also automatically search a central repository and use the found procedures to update the system with the new functionality.

Figure 9G:
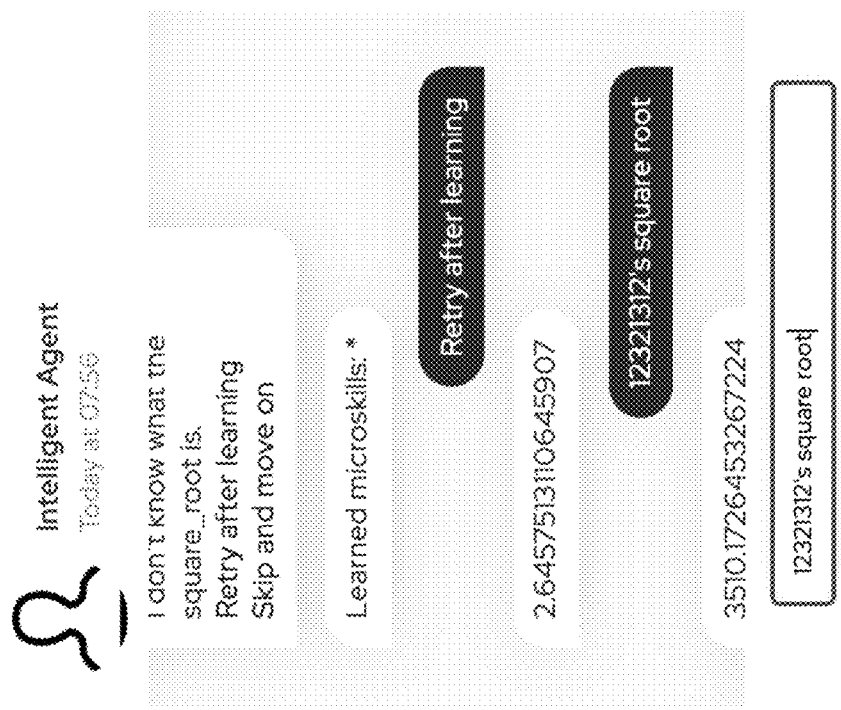

After the system has learned the procedure, the user can ask the intelligent agent to proceed. In another embodiment, the intelligent agent can self-detect that the relevant skill that was missing has been learned and automatically proceed with any prior stuck procedures. The system is then capable of answering further questions regarding square roots of numbers as shown in FIG. 9G.

Figure 10:
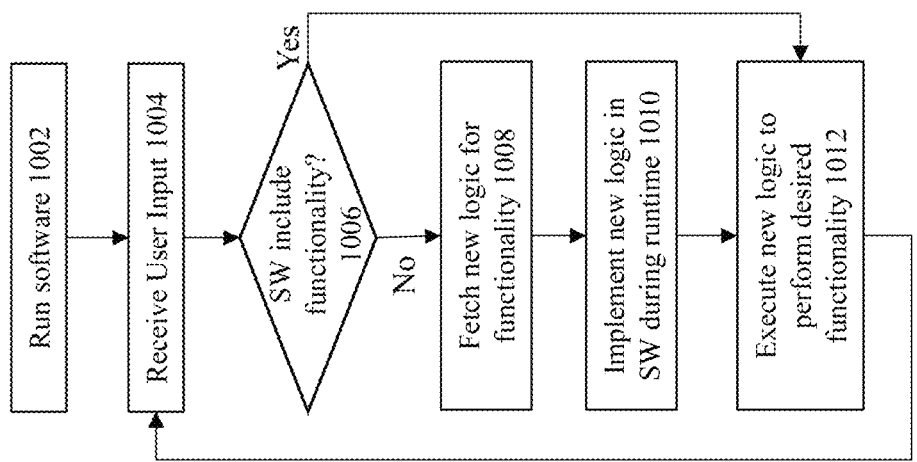
FIG. 10 shows a flowchart of an approach to use natural language to teach the system with a new skill according to some embodiments of the invention.

As is evident, embodiments of the invention are capable of teaching a system to use completely new skills using natural language. FIG. 10 shows a flowchart of an approach to use natural language to teach the system with a new skill according to some embodiments of the invention.

At 1002, the software is run in correspondence with an appropriate processing device, such as a mobile device, smart assistant, or personal computer. The software comprises a natural language processor as described earlier in this document.

At 1004, a user input is received that includes a request to perform a function or task. The user input comprises any suitable type of input. For example, the user input may correspond to a natural language input that is either spoken or typed into the system.

At 1006, a determination is made whether the software currently includes the functionality to perform the user command. The functionality may have been included by the original programmer that developed the software, or it may have been learned using a past iteration of the current process. The search may be performed, for example, by searching a knowledge graph for the required procedure.

If the functionality already exists in the software, then the processing goes to step 1012 to execute the functionality to perform the user command. An identified procedure from the knowledge graph is used to execute the desired functionality.

On the other hand, it is possible that the software within the system does not yet have the required functionality to perform the user command. If this is the case, then at 1008, new logic is fetched to implement the desired functionality.

The new logic may have been identified by automated searching of a knowledgebase. The new logic may also be provided by a user. In either case, natural language inputs from the user may be used to search for, provide, and/or confirm that an identified item of logic is the appropriate log to implement the desired functionality.

At 1010, the new logic is implemented into the system. This may be performed, for example, by using the new logic to implement a procedure that is then included into the knowledge graph with respect to the desired functionality. Thereafter, at 1012, the new logic is executed to perform the desired functionality. This approach therefore permits the learning of a new skill (or any other error correction as described herein) to be performed during the runtime of the software, without requiring execution of the software to be terminated (e.g., without terminating execution to recompile the software). This is because, after the knowledge graph is modified to include the new procedure/data, a subsequent iteration through the sequence of steps will then identify the necessary procedure/data by a subsequent query of the knowledge graph to perform the requested user command—even if it was not found the first time through the knowledge graph.

As illustrated in FIG. 11A-D, the system can now teach the system completely new skills in pure natural language. The lowest level actions are most likely in a traditional computer language like javascript, while the higher level glue-code or business logic can be in a pure natural language like English. An example of such an interaction is shown in these figures, where the system initially does not know how to do a task but then learns how to do it via a purely natural language instruction.

Figure 11A:
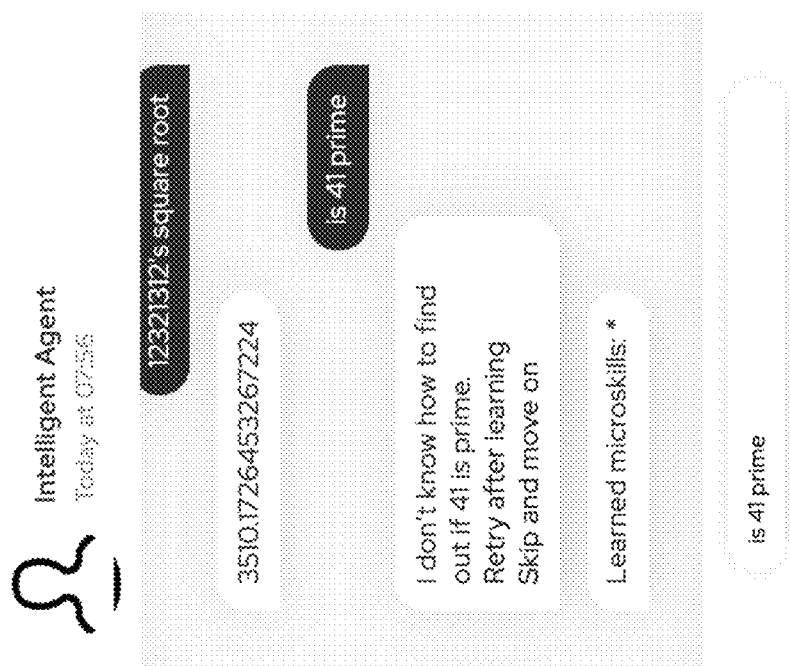
FIGS. 11A-D illustrate an approach to teach the system completely new skills in natural language.
Figure 11B:
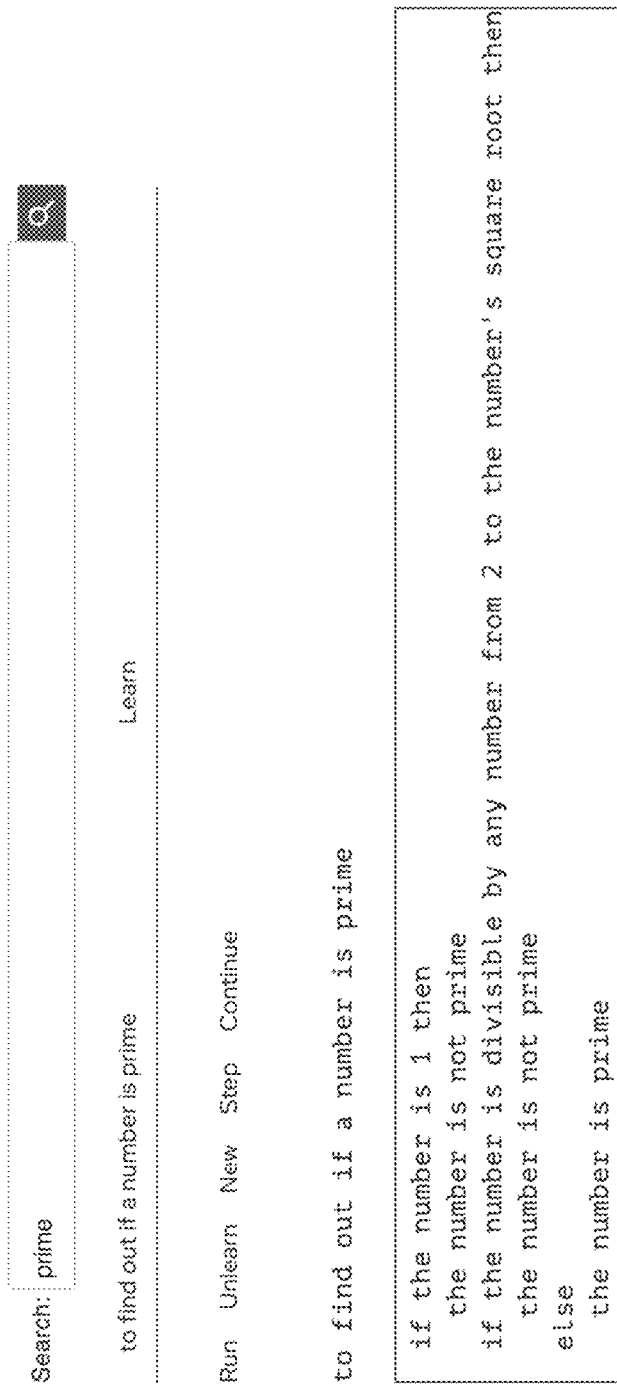

As shown in FIG. 11A, the system is asked "is 41 prime" by the user to determine whether the number "41" is a prime number. It is assumed that the system does not yet include functionality to perform this requested action by the user.

Here, the system knows that 'prime' is likely a word that describes the subject "41". However, in its knowledge graph, the system does not have any knowledge of what 'prime' could mean. Hence the system tells the user that it does not know how to find out if 41 is prime. The user can then type in, or point out otherwise, the procedure to find out if a number is prime as shown in the example procedure in FIG. 11B. It is noted that in the procedure of FIG. 11B, there are no function names, function parameters, return values, computer language symbols or even language punctuations (other than apostrophe) including capitalization. While adding more symbols and structure makes it easier to build a parser for the language, and most computer languages tend to overdo this, the added structure results in making the language hard to understand and learn for non-programmers. It is non-trivial to achieve this clean exposition of a program and it is done using many techniques, some of which are described below.

In some embodiments, capitalization is optional even for proper nouns. The reason is that when verbally dictating to a computer, the notion of capitalization may not be captured. Further, there are written natural languages like Hindi that do not have the feature of capitalization. Since this system is designed to work for any natural language, the current embodiment stays away from features that are not generally available in other languages. The AI-based model that is used to determine the role of words in a statement is trained to guess whether a word is a proper noun or not. In case it gets it wrong, there is a subsequent parsing step where based on the knowledge in the knowledge graph, the labelling can be corrected. That comes in useful when there are words that can be both a proper noun or an adjective, etc. based on the context. Like "hardy was there early", "he is hardy boy". Here "hardy" can be a proper noun or an adjective.

In certain embodiments, no function names are required because the system uses the natural description of the thing being computed or the task being performed as the name for the procedure. For example, "to find out if a number is prime" is in pure English, while in any traditional computer language, it would be something like "bool is prime (num)". Such a syntax that is derived from lambda calculus makes it hard and unintuitive for non-programmers to start programming.

There are also no parameters required in some embodiments. That is because the current approach has inverted the way programs are executed. In traditional computer languages, the data is passed to the procedure while in the current model the procedure is brought into the "brain" or the knowledge graph where the instructions are interpreted and resolved into concrete instructions based on what is in the knowledge graph. Similarly, the procedure commands access whatever data they want by referring to the knowledge graph directly. If the procedure is in English it uses natural language to refer to the knowledge in the knowledge graph. The natural language can look up entities by name like 'John' or by determiners like 'the employee', 'all friends', 'any 2 people from my soccer team', 'the last email', etc. Natural language can also be used to refer to the procedure to run which is chosen from the most specific environment that the intelligent agent is in.

In some embodiments, there are no return codes or values. This is possible because if the procedure is to find a value or determine an answer, as soon as a valid positive or negative answer is obtained, the procedure automatically stops. The current system does not have to explicitly stop the procedure. In the above example, any time 'the number is prime' or 'the number is not prime' is declared, the system detects that it is a valid answer to the question the procedure was seeking to answer and stops further processing. This is in line with how humans behave. For example, if a person is looking for a wallet, that person might have a program in his/her head to retrace everywhere he/she has been, but the person will stop looking for the wallet as soon as it is found. The current system does not have to explicitly state, as in all computer languages, to stop processing (e.g., via a return or done statement). Further, in order to return the value, the system does not pass the answer in a return code like in traditional computer languages. Instead, the current embodiment declares a new fact that enters the knowledge graph and thus the intelligent agent is now aware of the new fact and can subsequently use that fact without having to refer to the return code of the procedure. This avoids common mistakes and also the rigidity surrounding the semantics of return codes in computer languages.

Figure 11C:
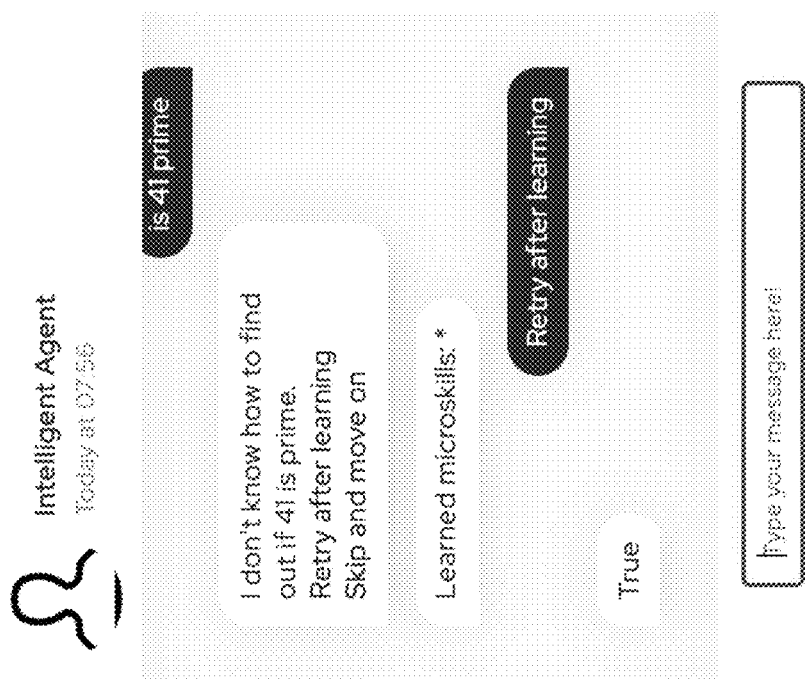
Figure 11D:
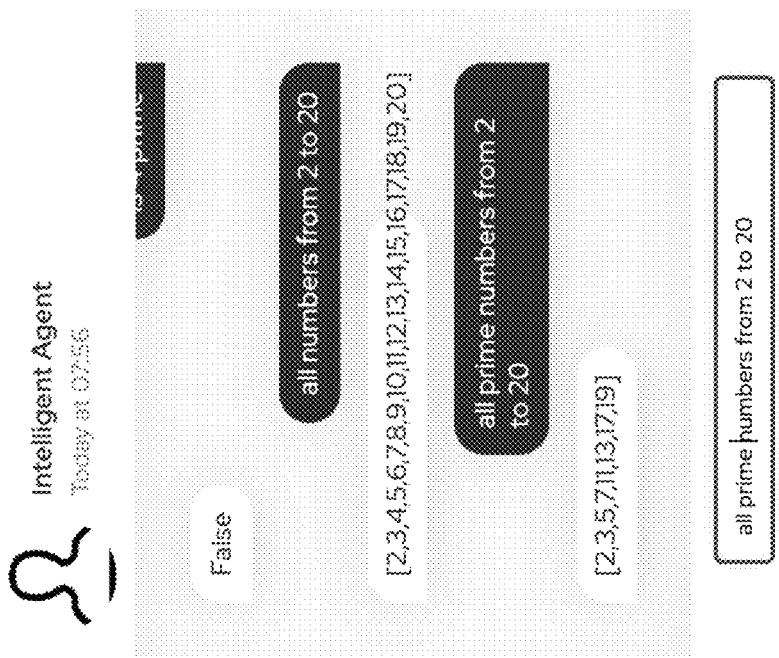

As can be seen in FIG. 11C, the system continues with trying to answer the original query of "is 41 prime" and after learning in English how to do it, it processes and provides the answer (True). Subsequently, the system is capable of applying this knowledge in other contexts which have not been explicitly taught to the system but are general patterns in human thought process and have been codified in the system. For example, just by learning whether a number is prime or not, now the system is able to filter out all prime numbers from a list of numbers as shown in FIG. 11D.

The embodiments of the invention can be used where an edge case or exception is identified when processing a user command. Unlike the previous approach where a new skill is learned for a procedure that is completely missing, this current approach can be used where the procedure exists but cannot be adequately performed because of an identified error or exception.

Figure 12:
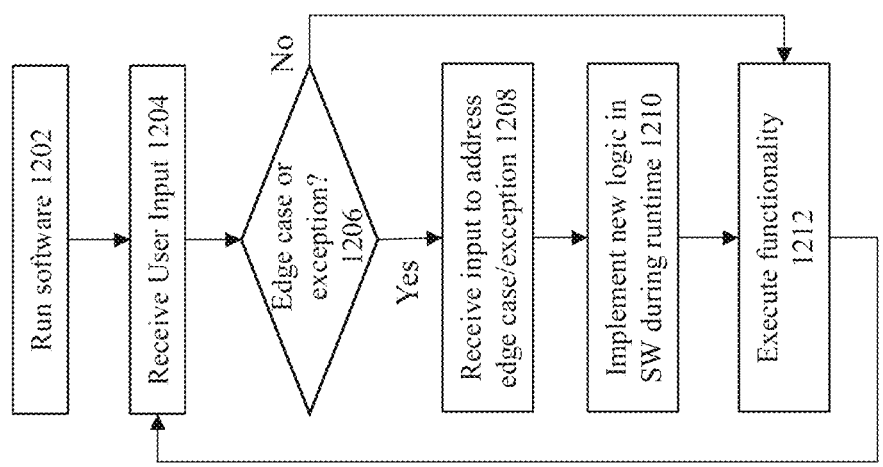
FIG. 12 shows a flowchart of an approach to handle an edge case or exception when processing a user command.

FIG. 12 shows a flowchart of an approach to handle an edge case or exception when processing a user command. At 1202, the software is run in correspondence with an appropriate processing device, such as a mobile device, smart assistant, or personal computer. The software comprises a natural language processor as described earlier in this document. At 1204, a user input is received that includes a request to perform a function or task. The user input comprises any suitable type of input. For example, the user input may correspond to a natural language input that is either spoken or typed into the system. At 1206, a determination is made whether an edge case or exception is identified for the requested functionality.

An "edge case" is a problem or situation that occurs at an extreme (maximum or minimum) operating parameter. Non-trivial edge cases can result in the failure of an object that is being engineered, particularly when they have not been foreseen during the design phase and/or they may not have been thought possible during normal use of the object. For this reason, attempts to formalize good engineering standards often include information about edge cases. In programming, an edge case typically involves input values that require special handling in an algorithm behind a computer program. As a measure for validating the behavior of computer programs in such cases, unit tests are usually created; they are testing boundary conditions of an algorithm, function or method. A series of edge cases around each "boundary" can be used to give reasonable coverage and confidence using the assumption that if it behaves correctly at the edges, it should behave everywhere else.

An "exception" corresponds to anomalous or exceptional conditions requiring special processing. In computing and computer programming, exception handling is the process of responding to the occurrence of exceptions during the execution of a program. In general, an exception breaks the normal flow of execution and executes a pre-registered exception handler; the details of how this is done depend on whether it is a hardware or software exception and how the software exception is implemented. Exception handling, if provided, is facilitated by specialized programming language constructs, hardware mechanisms like interrupts, or operating system (OS) inter-process communication (IPC) facilities like signals. In some cases, the identified edge cases correspond to problems that occur due to values of parameters, while the identified exceptions correspond to problems that occur due to the environment outside of the specification in the software program.

If at 1206 it is determined that an edge case or exception exists, then at 1208, inputs are received to address the exception or edge case. The input may have been identified by automated searching of a knowledgebase. The input may also be provided by a user. In either case, natural language inputs from the user may be used to search for, provide, and/or confirm that an identified approach to address the edge case or exception is appropriate for the current situation.

At 1210, logic is implemented into the system to address the edge case or exception. This may be performed, for example, by including the new logic into the knowledge graph with respect to the identified edge case or exception. Thereafter, at 1212, the new logic is executed to address the edge case or exception, so that the user's command is correctly executed.

Figure 13A:
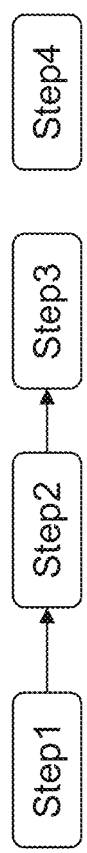
FIGS. 13A-I illustrate approaches to perform error handling according to embodiments of the invention.

In general, the basis for several of the current embodiments is to provide "human-like" error handling, which allows the system to "learn on the job" when an error is encountered. Some or all of the following error types may be addressed by embodiments of the invention: (a) Missing Data: where the typical machine behavior is to have a runtime crash, but the current embodiment will resolve the problem by asking for and learning a solution and then continue; (b) Missing Logic: where the typical machine behavior is to exhibit a compile error, but the current embodiment will resolve the problem by asking for and learning a solution and then continue; (c) Wrong Data: where the typical machine behavior will result in a bad result or a system crash, but the current embodiment will resolve the problem by discovering and learning a solution, followed by a redo of the processing; (d) Wrong Code: where the typical machine behavior create a bad result or a system crash, but the current embodiment will resolve the problem by discovering and learning a solution, followed by a redo of the processing; (e) Unexpected Situation: where the typical machine behavior is to result in a crash, but the current embodiment will resolve the problem by asking for and learning a solution, and then continuing with the processing; and/or (f) Incomplete Code: where the typical machine behavior is to assume the job is finished and terminate the process, but the current embodiment will allow for addition of new logic even after the code has run to completion, To explain, consider the case of a procedure as shown in FIG. 13A that has four steps (as an example, although it could have any arbitrary number of steps). If there is an error in Step 3, then the procedure fails at Step 3 and Step 4 is never run. The only way in the current state-of-the-art to recover from this situation is to clean up whatever side effects were done by Step1 and Step2, fixing the problem that caused the failure in Step3, and then retry the entire procedure starting with Step1. However, this approach is difficult to implement up-front because not all error cases can be foreseen by developers, or it is simply very expensive to invest in all the effort to handle the error cases.

Figure 13B:
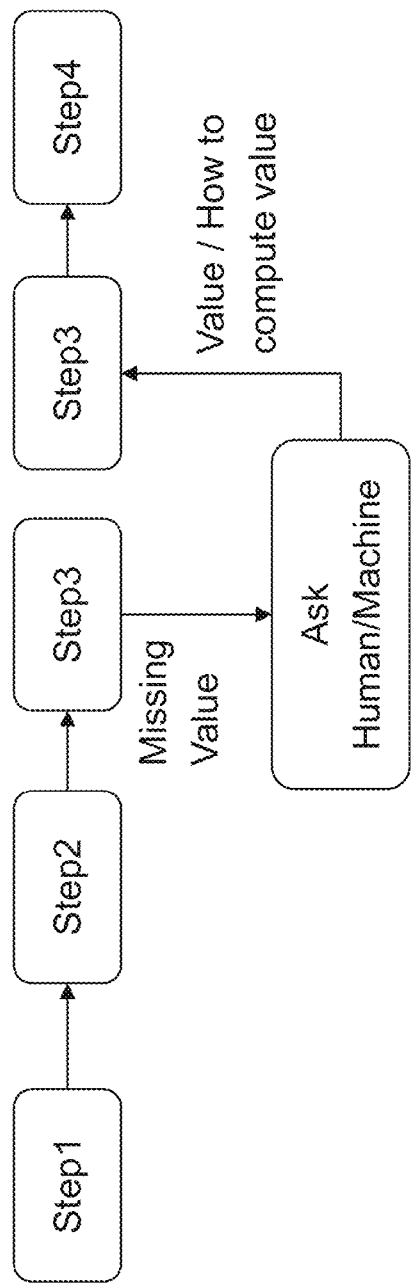

Instead, some embodiments of the invention provide a system that can learn what to do as and when it hits these types of errors. As shown in FIG. 13B, assume that the failure in Step3 is due to a missing value, for example, the step involved adding two quantities, but the value of one of them is not known to the system. In that case, the system stops at Step3, and then reaches out to a human or another machine (a computer system) that can provide the missing value or a method (a program) to compute the missing value. Once the answer is available, the system processes the answer and then uses that in Step 3 and continues to execute the Step3 which now succeeds. After Step3, Step4 is run and it also succeeds in this case. Note that this method does not require the user to clean up the side effects created by Step1 and Step2 as those steps are not repeated.

Figure 13C:
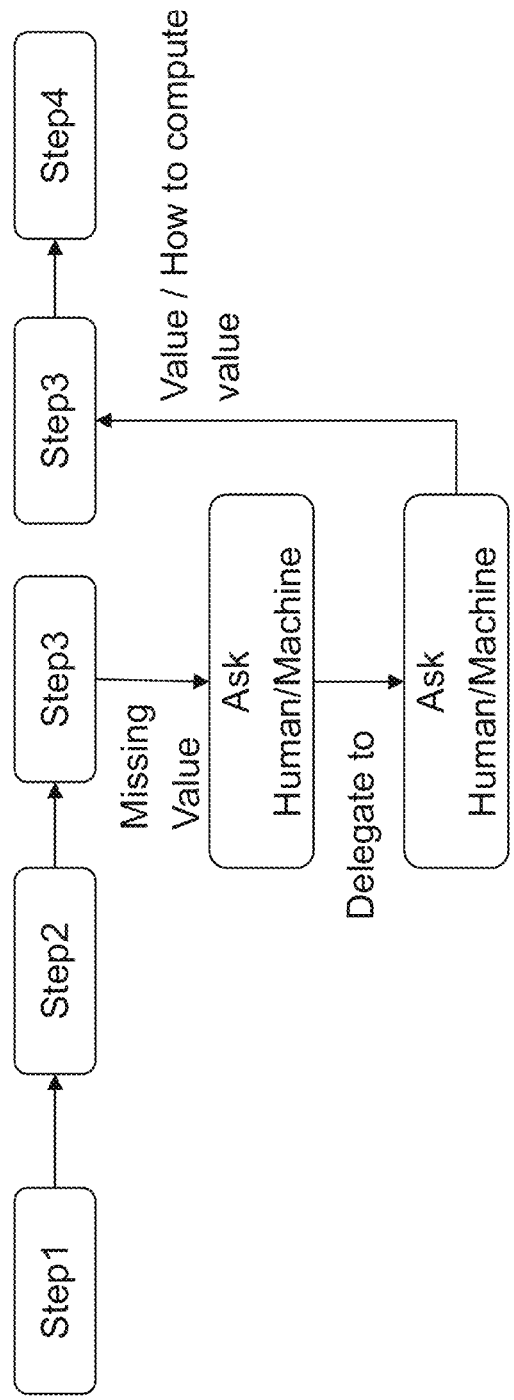

Now, the human or machine that is asked the question could delegate the question to another human/machine who/which can return the answer to the system (as shown in FIG. 13C). This delegation chain can be of any size. Furthermore, as the delegation is happening, the question could be enriched with more context, validation rules, choices, or other useful information provided by the human/machine.

Figure 13D:
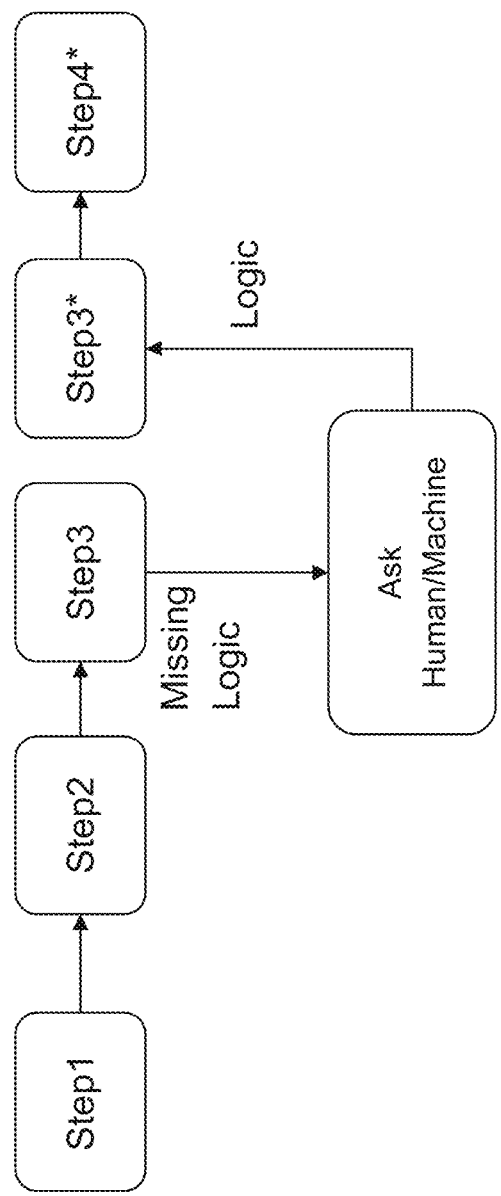
Figure 13E:
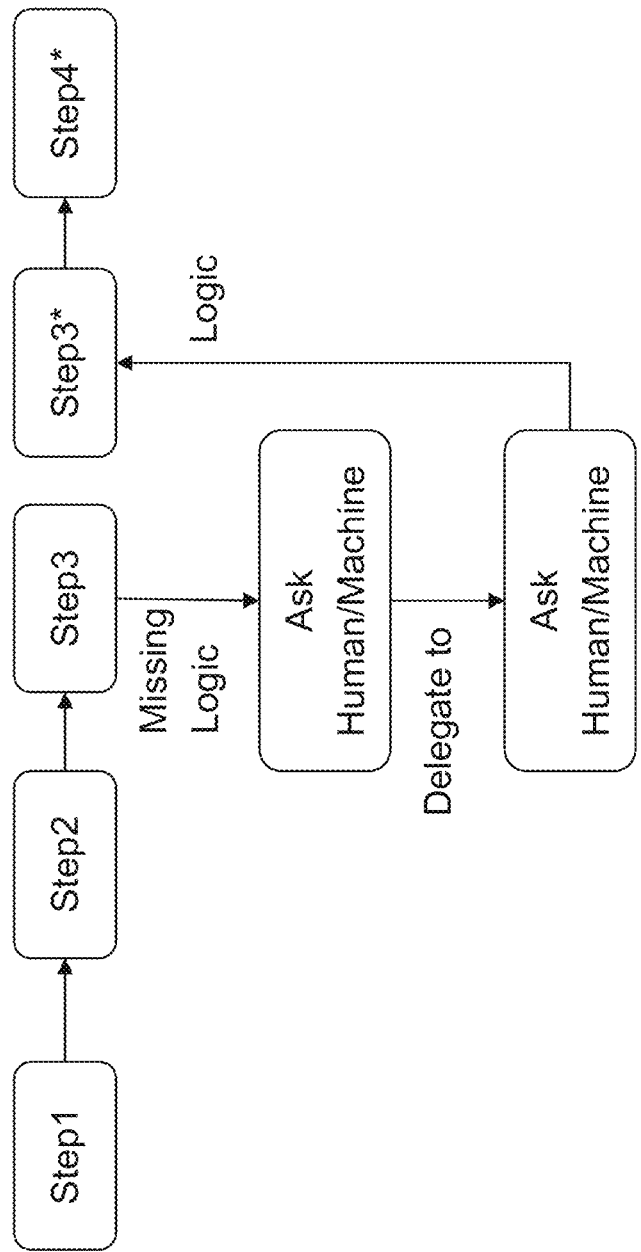

Another class of errors are the cases where the system does not know how to compute or do something. For example, the system may need to "send an email to a person" but it may not know how to do that yet. Normally, most computing systems will crash when this happens. In the system described herein, when such an unforeseen event happens the system does not crash, but asks a human/machine to supply the missing logic/code that can be used to execute the action, e.g., as shown in FIG. 13D. Here, the main idea to make this happen is to run the steps in a dynamic execution environment like an interpreter which allows new code to be added to the system while the system is running. Now, traditionally this has been difficult because inserting new code itself is not sufficient. The caller of the new code needs to comply with the format in which the new code desires to be called. That includes providing the right set of input parameters. That involves deeper changes in the current steps and is very difficult. However, making use of the ability of the system to ask for parameters as it needs them from the caller in an interactive manner (as discussed above), permits new logic to be inserted into a currently running procedure. FIG. 13E shows an example of the logic being supplied by a further delegated human or machine.

Figure 13F:
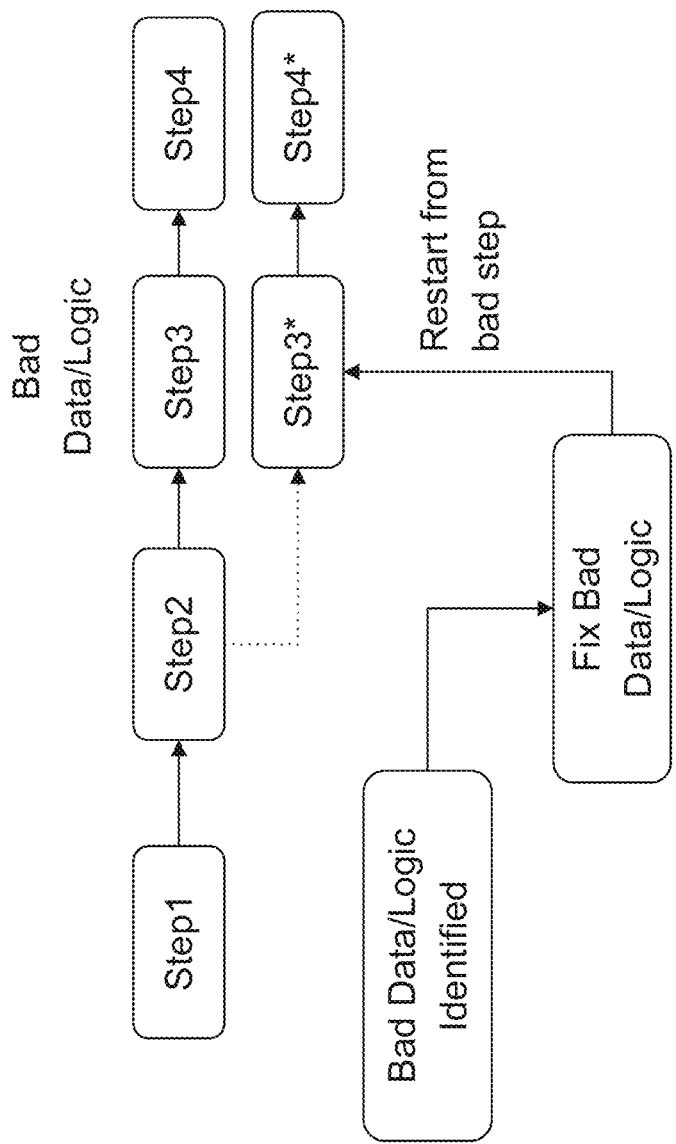

As illustrated in FIG. 13F, some embodiments address the class of errors where the steps get executed with either wrong data or wrong logic/code. This class of errors is spotted in some embodiments only after the fact. In current state-of-the-art, there is no easy way to recover or retry from these errors. FIG. 13F shows that in the first run through the procedure steps 1 through 4 were executed, but Steps 3 and 4 were executed with the wrong data or logic. Hence, one approach is to rewind back to step 2, fix the data/logic and redo Step 3 and Step 4. The proposed system allows the developer to rewind to a given step in a previously run procedure, change the data and/or logic/code and then resume the procedure from that point onwards. If "undo" steps are known for the step3 and 4, then will be executed prior to the re-execution of the modified steps 3 and 4. In a simpler case, the failing statement could be an assertion or invariant that failed due to bad data or bad logic. The proposed system allows one or more replacement statements to be supplied that fix the bad data and/or code and then continue to execute other steps beyond the failed statement.

Figure 13G:
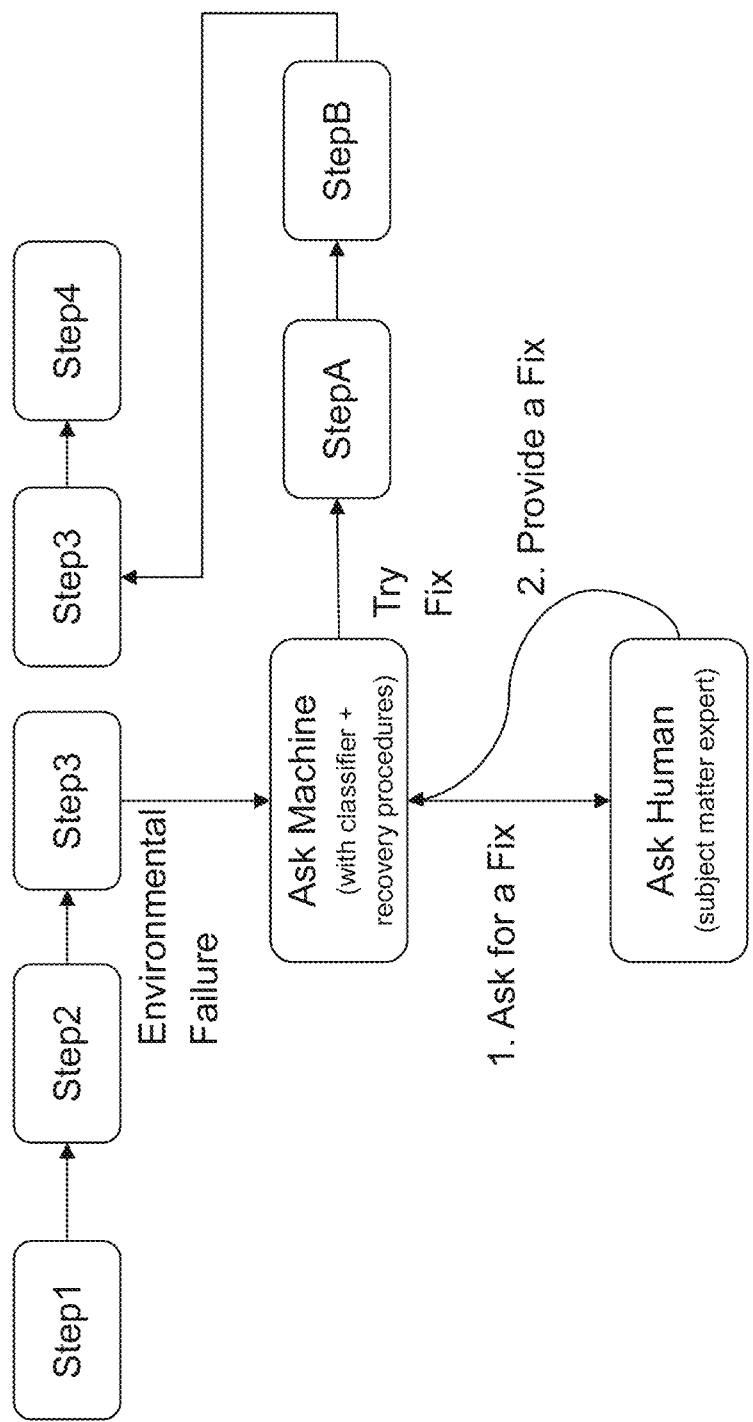

There are also errors that emanate neither from the data or code, but rather from the environment. For example, a procedure might fail because an external service became unresponsive for some time, or a computer hardware failed. In these cases, current state-of-the-art cannot do much, and normally system support personnel come and execute some recovery procedures. The system in some embodiments handles these cases in an intelligent manner. Whenever an environmental error is detected, the system reaches out to an error handling machine. The machine looks at the current error's signature and suggests running one or more recovery procedures, which if successful, trigger a reattempt from the failed step in the main procedure. If the machine does not have enough experience with this kind of error, it forwards the issue to a human subject matter expert. The human provides a potential fix, which the machine tries. If the fix works, the machine remembers the mapping between the error signature and the fix that worked. This allows it to self-service future similar errors. Over time the machine becomes intelligent enough to handle many error scenarios. This mapping of errors to potential recovery procedures can be done using any classification technique including but not limited to deep neural networks. As shown in FIG. 13G, the error recovery steps A and B are executed and then Step 3 is re-attempted leading to Step4 and successful execution of the entire procedure.

As illustrated in FIG. 13F, some embodiments address the class of errors where the steps get executed with either wrong data or wrong logic/code. This class of errors is spotted in some cases only after the fact. In current state-of-the-art, there is no easy way to recover or retry from these errors. FIG. 13F shows that in the first run through the procedure steps 1 through 4 were executed, but Steps 3 and 4 were executed with the wrong data or logic. Hence, one approach is to rewind back to step 2, fix the data/logic and redo Step 3 and Step 4. The proposed system allows the developer to rewind to a given step in a previously run procedure, change the data and/or logic/code and then resume the procedure from that point onwards. If "undo" steps are known for the step3 and 4, then will be executed prior to the re-execution of the modified steps 3 and 4.

Figure 13H:
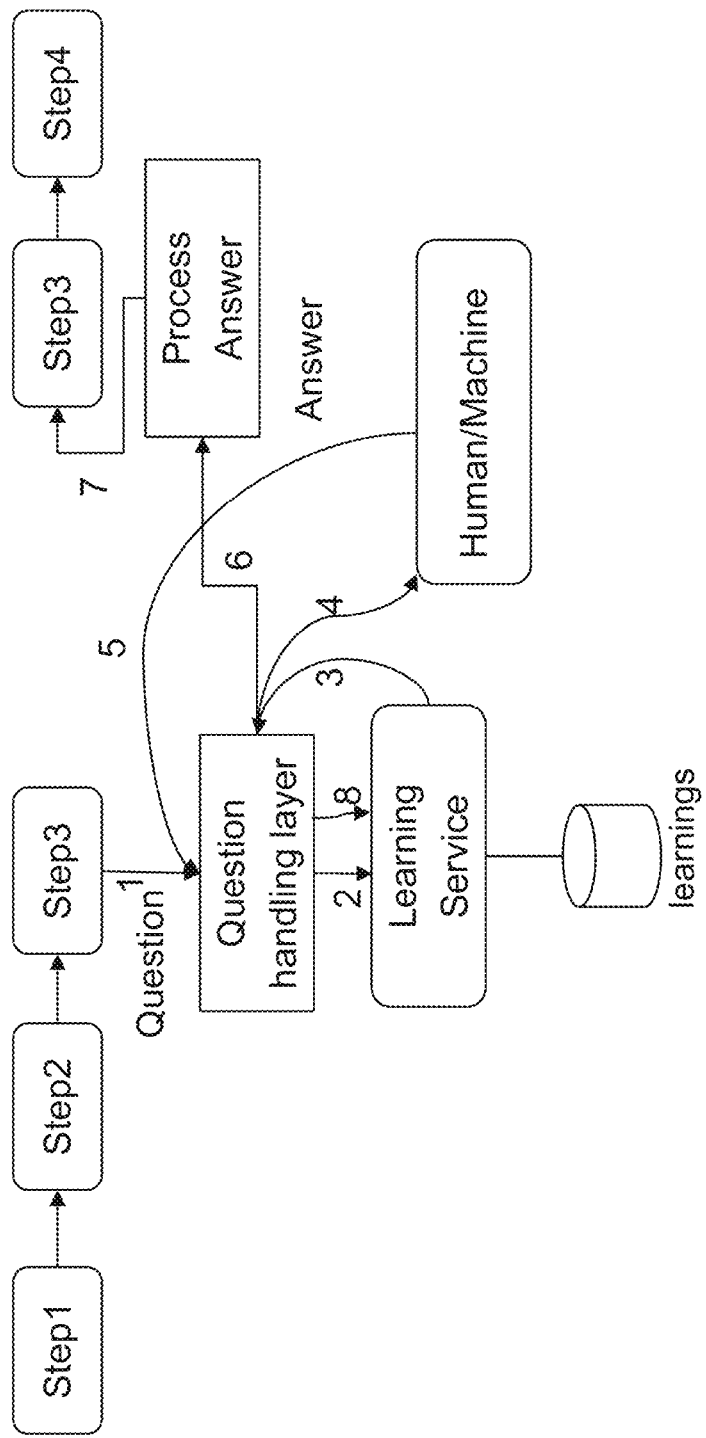
Figure 13I:
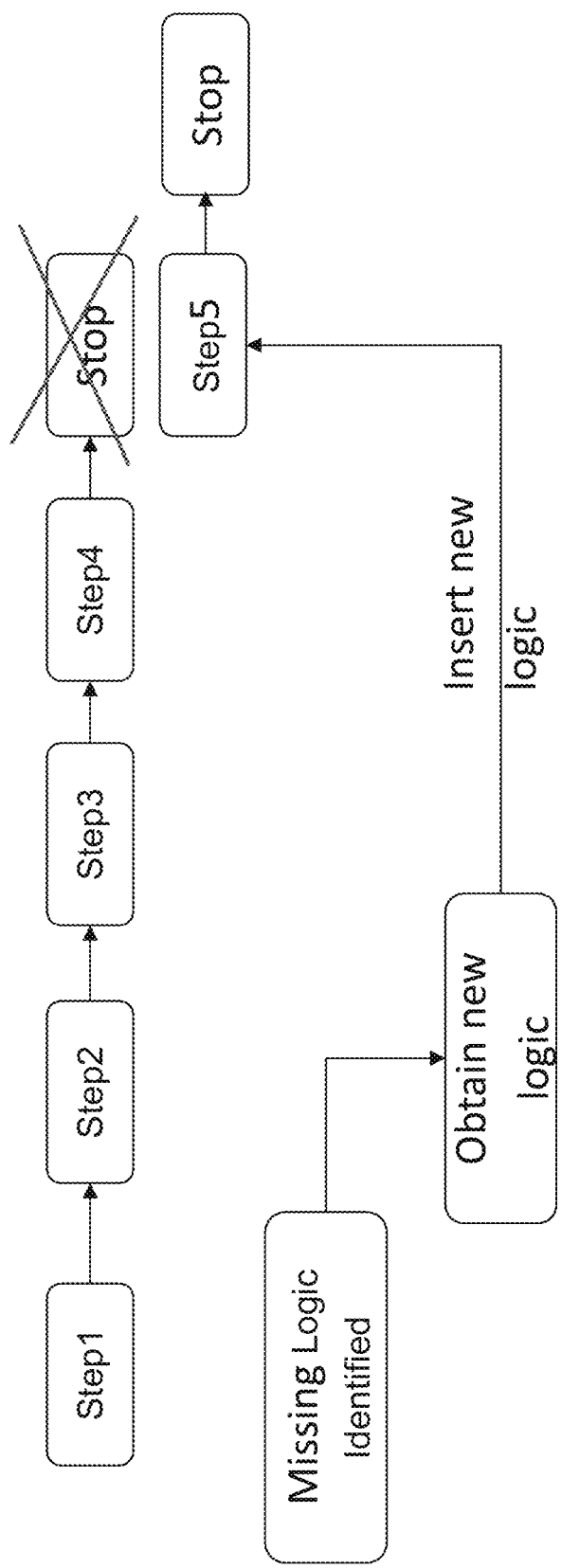

As illustrated in FIG. 13I, some embodiments address the class of situations where incomplete code was executed. This class of situations are sometimes errors and at other times are intentional. When the incompleteness of the code is unintentional, it is only after the fact that the error is discovered, usually by a human observing the record of what has been executed. In current state-of-the-art, there is no easy way to ask the machine to insert another step at the end of the incomplete run. FIG. 13I shows that in the first run through the procedure steps 1 through 4 were executed, and the system stopped after Step 4. The proposed system allows one to provide one or more new steps to be appended to the end of the completed run and ask the system to continue with the preserved state of the Step 4. This is made possible by the fact that the proposed system keeps the detailed trace information of the steps run even after the original steps finished. In most current computer systems, the details of the run are thrown away after the steps are completed rendering it impossible to append any new continuation logic after the first run has completed. As shown in 13I, a human or external system determines that some logic was missing, the new logic is obtained from an external system or a human and is inserted at the end of the prior run's logic. The system then resumes from where it had stopped and executes Step 5 and then stops, but can receive and execute more steps in a similar fashion.

In another embodiment of the system, the system is capable of learning how to answer arbitrary questions (not just the questions around error handling as seen in the previous sections). To permit this, the question is expressed in a format, a preferred embodiment of which is shown in FIG. 9, although other formats including natural language formats could be used. Whenever, there is a question during the execution of a procedure, the question is forwarded to the question handling layer (as shown in FIG. 13H). The question handling layer then forwards the question to the learning service which looks into its database for matching answers. If there is a matching answer found, then the learning service forwards the answer to the question handling layer which then processes the answer and then retries from the step that was waiting for the answer. In the other case, where the learning service does not have a matching answer, the learning service forwards the question to a subject matter expert which could be a human or a machine that understands the question and its structure. The human or machine can give an answer which the question handling layer uses. In this case, when the answer is deemed as useful, the question handling layer teaches the learning service the answer for future reference.

Any suitable question format may be used in embodiments of the invention. The question type (Qtype) pertains to the type of question that may be posed (e.g., when, where, how, what, why questions). The question path (Qpath) pertains to the path that describes the object of interest. (e.g., if one is looking for the capital of a country, then the qtype is "what" and the path is "the capital").

The question may be in any number or types of context. The following is an example list of contexts of the certain types, where each context has more detailed information identifying the situation in which the question was asked. (1) subject context, where this context contains the subject about which the question is asked, can be an ID or name of the subject, with details of the relationship of the subject with other relevant entities (like John, son of Adam, grandson of Bob), and/or each entity also carries type information. (like John—a person, Adam—a person, Bob—a person); (2) procedure context, where this context contains the procedure/code/logic that was being run when the question arose, and typically this will refer to the step number in a named procedure; that procedure may further be embedded in another procedure and so on; (3) user context, where this context records the humans or machines involved in the process when the question arose, e.g., the user who invoked the procedure and the user who wrote the procedure can be captured in this context; (4) time context, where this context captures the exact time when the question arose, and also captures duration information which could be more flexible like "on Monday", "every day after 5 pm", "at noon", "every leap year on January 1"; (5) location context, where this context captures the location where the parties of interest are at the time the question arose, e.g., the location of the machine running the process and the location of all the users in the user context can be represented in this context; and/or (6) system context, which pertains to the ID of the system which asked the question.

"Rejected answers" pertain to answers to the question that have already been rejected. "Rejected answer recipes" pertain to logic/code that were earlier proposed to find the answer, but have been rejected. "Validations" pertain to conditions that must be met before accepting any answer. For example, date must have certain formats, Age must be selected from a range, Password must have a digit and a special character. "Delegates" pertain to a list of users who have been asked this question. "WaitPolicy" pertains to how long will the system asking the question wait before deciding to move on (either ask someone else or fail the step).

Answers may be provided by any suitable source or technique. For example, a user may be the source of an answer to a question. When a user is answering a question, the user can specify what subset of the contexts need to match for the answer to be considered applicable. For example, the user can provide an answer while keeping all the contexts, but removing the time context. That would mean that independent of what time it is, the answer is applicable as long as all the other contexts match. The user can also reduce the specificity of the contexts like location, user, procedure and even subject and thereby broaden the applicability of the answer. If the user removes the systemID, it makes the answer applicable to all systems.

In some embodiments, a machine that understands the question structure could answer the question instead of a user. An AI-based machine can be employed in conjunction with a knowledgebase to provide the answer.

The user and/or machine can also delegate the question to another entity. For example, the user/machine can simply delegate the question to some other user(s) and/or machine with or without some additional validations and the learning service will learn to delegate as a response.

A learning service can be used to provide the answer. Based on the qtype (question type)), qpath (question path), and/or contexts of the question, the learning service can determine which prior answers are an exact match and/or closest matches to the question. When an exact match is not found, the closest match could be found using heuristics involving a distance between the context of the question that the answer answers and the current question. Deep neural networks can also be used to determine the best matching answer for a given question.

Crowdsourcing can also be used to provide the answer. The learning service stores answers learned with the system identifier (systemID) as one of the contexts. When there is no answer with a matching systemID, the learning service can refer to answers from other systems. To provide for privacy, in a preferred embodiment, the learning service will only use answers from other systems if they belong to the same organization/user or the answer is fairly common among systems and thus is not identifying the other systems in any way (this is how autocomplete works when one types in emails and/or search bars).

This disclosure will now describe an approach to pass a parameter in natural language to a procedure in a native language. In computer science, work is done in units of computation called functions, methods or procedures. Each such procedure can be composed of simple statements or calls to invoke other procedures. The normal way of passing information from the calling procedure to the called procedure is by using "parameters" or "arguments". Computer languages use procedure declaration and invocation logic (the Python language is used here as an example, but all other languages use similar constructs).

The procedure is declared as "def my_procedure (my_arg1: int, my_arg2: str)". The invocation of the procedure is done as follows in an example:

```
def caller_procedure( ):
    some_number = 21
    some_string = "foo"
    another_string = "bar"
    my_procedure(some_number, some_string)
```

It is noted that if it turns out during the execution of the procedure "my_procedure" that it needs access to another piece of information from the caller procedure (for example 'another_string'), then it cannot be done at runtime because the definitions will have to change and the code will have to be recompiled, which implies restarting the program.

Some embodiments provide an approach to pass information from the calling procedure to the called procedure. Instead of the information being passed into the called procedure, the called procedure pulls information from a shared knowledge graph. This is strictly more powerful than the traditional approach because it allows the called procedure to have access to all of the information in the knowledge graph without up-front deciding what that needed information might be. However, sometimes, even the knowledge graph may not have the information. Normally, in a computer, this would result in an exception that would normally terminate the program. However, in the current system, this allows the missing information to be furnished to the called procedure by an external system or human while the called procedure waits for the information.

In some embodiments, the natural language procedure may modify a knowledge graph before invoking the native language procedure. The native language procedure invokes a special function to retrieve parameters, where the special function first looks up a knowledge graph for the parameter, and the special function then looks up an external program/ service or asks a human for the parameter. The native language procedure may obtain access to parts of speech concepts in natural language by looking up using special names like 'subject', 'object', 'preposition', etc.

There are many benefits of this approach. Firstly, the calling procedure does not have to change when the called procedure is changed requiring more information. This is because information is pulled from the called procedure instead of being passed into the called procedure. Secondly, when information is not available in the knowledge graph (for example, the password to access a system), the procedure does not crash like a normal computer program would. Instead it waits for human input and once the input is obtained, the called procedure proceeds as if the information was there in the knowledge graph. The benefit of this is that procedures do not crash because of missing information requiring a human to not only remedy the missing information but also figure out how to restart the failed procedure after cleaning up for the steps that happened before the failure.

Figure 14:
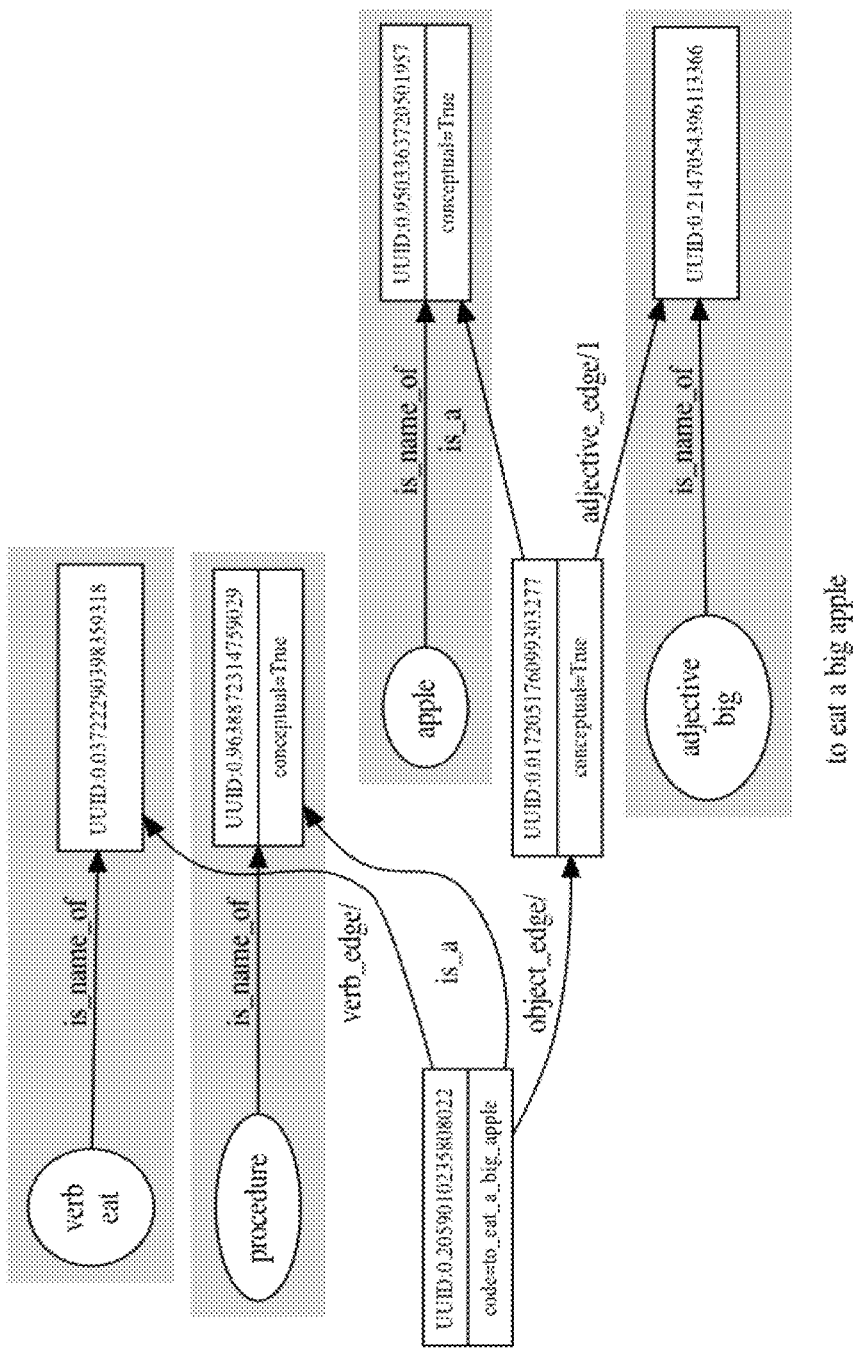
FIG. 14 shows a sample representation of a knowledge graph used to represent facts and procedures.

Some embodiments of the invention pertain to approaches that rely upon resolution of procedures. As part of processing a natural language command as discussed previously at step 804 of FIG. 8, searching is performed for the procedure to run. Procedures are kept in the knowledge graph in some embodiments. The following is a list of some example procedure types: (1) Proper noun procedures; (2) Common noun procedures; (3) Adjective procedures; (4) Preposition procedures; and/or (5) General procedures. A proper noun procedure is a procedure that returns a representation of the proper noun by running some native computer code. For example, "salesforce is <code>" when executed will run the specified code which returns a native representation of the proper noun "salesforce". That native representation could have methods to get further properties of "salesforce" or might have some metadata like the username, password and/or location of "salesforce". Such a procedure and its code are represented in the knowledge graph as a vertex which has the code as one of its properties. A common noun procedure when executed could return instances of the common noun. For example, "the employees are <code>". When the code is executed, it returns a list of representations of employees. Just like proper nouns, a common noun and its code are stored as a vertex in the knowledge graph. Adjective procedures specify the logic that is used to determine if a noun satisfies the adjective or not. For example, "a number is odd if <code>". Here, to determine if a number is odd or not, the given code is run and based on whether it returns True or False, the determination is done as to whether the number is odd or not. The code is stored in a vertex that represents "an odd number" in the knowledge graph. Similarly, a prepositional procedure is used to determine if a noun satisfies a preposition. For example, "a word is in a message if <code>". Here to determine if the word is in the message, the code is run, and just like in the adjective case, the result determines if the preposition is satisfied or not. General procedures are more flexible. It represents code that corresponds to any imperative statement of natural language. For example, "to send an email to a person <code>", provides the code to be executed any time the system needs to send an email to any person. The represent this information in the knowledge graph, a vertex is created which has the code as one of its values. To encode the phrase "to send an email to a person", the parts of the speech in the phrase are extracted. In this case, they are "verb=send", "object=an email", "preposition=to a person". Then these parts of speech are encoded in the knowledge graph via graph edges emanating from the vertex to the vertices in the knowledge graph that represent each of the concepts in the parts of speech. An example of such a vertex and its relations to parts of speech concepts in the knowledge graph is shown in FIG. 14 which depicts a procedure "to eat a big apple <code>". The code is contained in the concept which has "code=to_eat_a_big_apple". There is a verb edge from that concept to the verb concept whose name is "eat". There is an object edge to a concept which represents a big apple (the concept is an apple and is big). Thus, the vertex represents "to eat a big apple" and stores the code to do so.

The need to resolve a procedure arises in one or more of the following ways: (a) Via Noun resolution; (b) Via Adjective resolution; (c) Via Preposition resolution; and/or (d) Via an imperative action clause.

With regards to computing a proper noun, proper nouns are complex entities and thus if they have a procedure attached to them it invariably returns functions used to resolve child concepts under the proper noun.

With regards to computing a common noun instance, when a child relation of a vertex is being looked up, the system first attempts to compute the child instance. To determine if there exists a procedure to compute the child, one can look at all equivalent vertices of the child vertex in the brain graph and run any code available in the nearest equivalent vertex. If no such code is obtained rendering the child uncomputable, the system can resort to searching in the brain graph for the child as a second measure. If that also fails, then the system looks for any domain-specific resolvers that are applicable and execute appropriate methods from the domain. Failing this, a realization can be made that the child cannot be obtained and either reach out to the user or create a placeholder for the child based on the field type of the noun being computed.

When computing an adjective, when determining if a concept in the brain has an adjective, one can first see if there exists a procedure to compute the value of the adjective. If yes, then run the code to determine the value. If no, then search the brain graph to determine whether the adjective is true for the subject concept.

Figure 15:
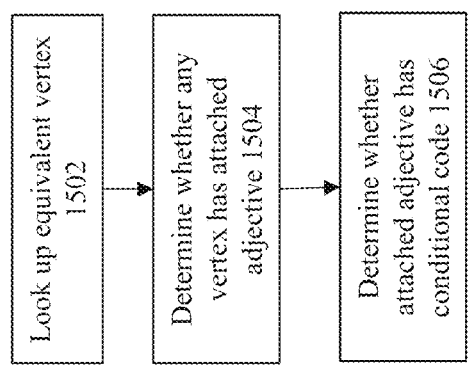
FIG. 15 shows a flowchart of an approach to look up a procedure.

FIG. 15 shows a flowchart of an approach to look up a procedure. At 1502, the processing looks up the equivalent vertices of the subject vertex. At 1504, a determination is made whether the vertex has the adjective attached to it. If so, then the subject vertex has the adjective. At 1506, a determination is made whether the attached adjective vertex has a conditional code. If so, then that is run to determine whether the subject vertex has the adjective or not.

With regards to computing a preposition, this can be resolved similar to the adjective case by looking for the concept in the knowledge graph that corresponds to the preposition and executing the code that is part of the concept.

With regards to resolving an imperative action clause, each action clause has a list of resolved nouns as concepts corresponding to the parts of speech in the clause. That map of concepts can be referred to as the "i_concept_map". The right procedure to execute is chosen based on one or more of the following rules: (1) The procedure should have edges corresponding to each part of speech concept in the i_concept_map; (2) The edges should point to a vertex that is equivalent (defined above) to the concept in the i_concept_map; (3) If multiple procedures match, use the most precise procedure which is the procedure whose edges point to the least general vertices. Inheritance applies to all nouns and the more precise vertex is preferred, e.g., John is more precise than "a man", and "a man" is more precise than "a living thing"; (4) if a part of speech is plural, prefer matching a procedure that has an edge pointing to a plural vertex that is equivalent to it, where failing this, break up the instances in the plural concept to a list of singulars, and then look for a matching procedure that is then applied to all the singulars individually, e.g., for "send the emails", where the system prefers a procedure that has edges to "send" and "emails" and failing that, look for the procedure which has edges to "send" and "an email", and then invoke the procedure for each email that was matches with "the emails"; (5) procedures that are defined within other procedures or environments are not allowed to match outside of their definition scope, where the system allows procedures to be available only within the scope of a parent procedure, e.g., "to order a pizza" could be qualified as "while in San Jose" environment, or within "to arrange a birthday party" procedure, and all else being the same, the procedure that is closest (in lexical depth) to the invocation point is chosen; (6) if multiple matching procedures are found, then the user is asked to guide as to which one should be used, and once the user provides the answer, the processing resumes; (7) if zero matching procedures are found, then the user is asked to provide new logic/procedure to learn, and once the user provides the logic, the processing resumes.

With regards to equivalency of vertices, this approach captures a generalized form of object inheritance as defined in OO (object oriented) languages. For any vertex, the following are equivalent to it in order of precedence: (1) Self; (2) Self's cousins; (3) Self's base classes, where a base class should have the same or fewer adjectives/prepositions (making it a base class). It cannot have an adjective/preposition that self does not have.

A cousin is a vertex that is a child of a vertex that is equivalent to one of self's parents. This is a recursive definition, so there can be second cousins, third cousins, etc. For example, If self has a parent vertex (<parent>) with a relation r/<rel> to it, then if <parent>-c/<rel>→(equiv) exists, then equiv is equivalent (1st cousin) to self. However, (equiv) must have the same or a subset of the adjectives/prepositions that self has. And if <grandparent>---r/<rel1>-->parent---r/<rel2>→(self) is equivalent to <grandparent>---c/<rel1>-->parent---c/<rel2>→(equiv), then it is equivalent as well. This is done recursively and hence adjectives/prepositions are taken care of at each level. Note that a relation starting with "r/" indicates a relation to an instance of a class, where a relation starting with "c/" indicates a relation to a class.

Some embodiments of the invention provide an approach to define procedures (in natural or native language) to determine if a concept satisfies an adjective, and to use the adjective in natural language sentences in a natural language program.

In normal natural language, one uses adjectives as a way of filtering and selecting based on which entities satisfy the property. For example, while "all cars" implies that one is talking about all possible cars, "all red cars" narrows down the selection to only the red cars. Further "all old red cars" narrows it down further to the red cars that are also old. Natural language is very concise in this aspect where filtering down a set of entities based on a property can be done by the mere introduction of a single adjective.

By contrast, most computer languages do not have such conciseness or readability when doing filtering. For example, in Python, "all red cars" would be expressed as: [c for c in cars if car.color=="Red"]. Not only is this expression verbose, but it may also be unintelligible to a non-programmer.

Some embodiments are directed to an approach to provide the conciseness and clarity of natural language adjectives into a programming language paradigm. To determine whether a car is red could be a simple procedure or it could involve a deeper computation (for example figuring out if a car is old may require comparison of dates). This logic that determines whether an entity satisfies an adjective can be expressed in a native computer language or in natural language. However, independent of how the adjective determination is done, the usage of the adjective can be done in the same way in the natural language program as shown in FIG. 9D and FIG. 11D. Any time the natural language interpreter processes an adjective, it looks up its knowledge graph to see if there is a procedure to determine if an object of the right type (car or number) is the given adjective (red or prime or divisible). If there exists a procedure, then the interpreter runs that procedure using the right execution engine (Python, javascript or natural language interpreter itself). Based on the answer obtained at the end of running the procedure, the interpreter decides whether the object of interest satisfies the given adjective or not, and based on that does the appropriate filtering. An example of such filtering can be seen in the FIG. 16 where out of all the numbers from 2 to 20 only the prime numbers were obtained by filtering out the prime numbers using the procedure that determines if a number is prime.

This disclosure will now describe an approach to resolve nouns according to some embodiments of the invention. A noun is a phrase that points to something that can act as a subject or object of a verb or is the subject of an expression. The following are examples of subject, object, or prepositional target nouns in facts: Subjects are shown in double quotes, objects in single quotes and prepositional targets can be underlined for clarity: (a) "John" is 'a person'; (b) "John's age" is 21; (c) "John's red car" which is in the garage is broken (where the words "the garage" can be underlined); (d) "John's red car's deflated tire" whose air pressure is 21; (e) "the bank account number" is 1234. The following are further examples within expressions that are computed: (a) "John's age"; (b) "John's car" which is in the garage (where the words "the garage" can be underlined); (c) "the even number"+"the odd number". As discussed in more detail below, based on the type of clause and sometimes the role of the noun in the clause, the system assigns a field_type to the noun. The field_type is subsequently used in resolving the noun to a new/existing concept in the brain graph, or a new/existing concept in the stack.

Regarding a structure for how nouns are resolved, it is noted that the engine (brain) stores concepts in two places: (i) the knowledge graph, (ii) the context trace. The knowledge graph or the brain graph is a representation of the facts that the brain knows. It can be stored in a graph database or a simpler key-value database or simply in memory. The context trace is a representation of what the brain has executed and is similar in concept to what a "stack trace" is in a traditional computer system. However, the big difference is that the system keeps the contexts (or stack frames) around even after the procedure finishes, whereas, most systems will unroll the stack and delete the data that was in the stack frame after the procedure is done. The context trace is a hierarchical structure. Each context has 0 or more sentences. Each sentence in turn can have 0 or more contexts. Each sentence represents one natural language command or an invocation of a native language procedure.

Whenever a sub procedure is run, the sentence structure also stores what is called a POS (part of speech) map of the concepts in the sentence that the brain determines are needed by the called procedure. The first step is to examine the type of the clause (or sentence) that is running. The parser is able to determine the clause type based on natural language processing using AI. The second step is to examine each noun in the AST and determine the Field Type for the noun based on the clause type of the sentence. This mapping is provided in FIG. 16. The third step is for each noun to be resolved, based on the field type looked at in the corresponding table of resolution algorithms to use.

With regards to detecting and handling of exceptions, when resolving a concept using a resolution algorithm, the system attempts each step in the resolution algorithm. If a match is not found, the resolution algorithm detects the exception and then suggests the action to take. The action could be to ask the user, to create a new concept in the knowledge graph, or to ignore the exception and carry on. When the action is to ask a user, the resolution algorithm pauses the execution of the procedure that was attempting to resolve the noun. This causes the system to reach out to the user or an external system to get the missing value or missing logic that can furnish the value. Once that information is obtained, the system re-evaluates the nouns in the command being executed and this time around, the resolution algorithm gets the answer either directly from the knowledge graph or by computing the value, and then the overall procedure resumes from where it had stopped.

A clause is something that has a subject and a predicate. In action clauses the subject is the implied 'you' and thus not explicitly mentioned. The following are example types of clauses: (a) action; (b) fact; (c) query; (d) future query; and/or (e) procedure.

Some examples of action clauses are (shown in double quotes): (a) "run"; (b) "send the email"; (c) if the email is received then "say 'received'".

Some examples of fact clauses are (shown in double quotes): (a) "John's age is 21"; (b) "a number is even if the number is not odd".

Some examples of query clauses are (shows in double quotes): (a) "John's age"; (b) is 43 prime; (c) if "the email is big" then say 'big'; (d) send the employee "who is sick"; (e) delete the database "which is corrupted".

An example of a future query clause is (shown in double quotes): whenever "John's age is 21" say 'happy birthday'.

An example of a procedure clause is (shown in double quotes): "to send an email" say 'hi'.

As noted above, based on the type of clause and sometimes the role of the noun in the clause, one can assign a field_type to the noun. The field_type is subsequently used in resolving the noun to a new/existing concept in the brain graph, or a new/existing concept in the stack by using an appropriate algorithm for resolving the noun.

FIG. 16 provides an illustration of a table that correlates a noun appearing in a clause of a certain type, which is assigned to a given field type. This table therefore describes example approaches to resolve nouns in clauses to field types.

One particularly interesting case is regarding facts. Facts can have two types of nouns: declarative and query. Declarative nouns receive a replacement value, whereas query nouns receive a qualifying property (adjectives, prepositions, and is _a relation). For example, "The mail is the context". "The mail" is Declarative, and "the context" is a query. In "The mail is received.", "the mail" is a query because more information is added to the LHS, which should already be defined. In "The mail's body is long.", "The mail's body" is a query. In "The mail's body is the context.", "The mail's body" is Declarative.

Some embodiments define algorithms to resolve fields which will be used to define the resolution behavior for the different field types. With regards to resolution algorithms, any step (going from a noun to a related noun), is performed using one of the resolution algorithm types described below. Resolution is essentially a sequence of places to look for the concept, and if not there what to do about it (declare something new, ask the user, or ignore and continue).

For a resolution pertaining to "StackDeclareFactInstance", the algorithm performs (1) Look for matches from the POS (parts of speech provided while calling the enclosing procedure); For example, if "sent 'hi' to John" is invoked, and the procedure that is called is called "to send a message to a person", then, in the POS map, "the message" will map to 'hi' and "the person" will map to John. Such a POS map is created any time a procedure is called, and in this step the system can look up the POS map, and (2) Create an uninitialized instance (A singular or plural concept) on the stack and return.

For a resolution pertaining to "StackDeclareInstance", the algorithm performs: (1) If the concept is expressed as "the . . . " (as opposed to "a . . . "): Look for matches in the concepts that were introduced in the sentences or steps executed before this step. The sentences leading up to the sentence being executed are called "context sentences". The system can look in the reverse order starting from the current statement working backwards to find the nearest sentence or step where the concept (e.g. the person) was introduced; (2) If the concept is expressed as "the . . . ": Look for matches from the POS as described above; (3) Create an uninitialized instance (singular or plural on the stack and return.

For a resolution pertaining to "StackQueryInstance", the algorithm performs: (1) Look for matches in the context sentences (as defined above); (2) Look for matches from the POS; (3) Ask the user if the system should create an instance. The processing may also ask for the value if relevant.

For a resolution pertaining to "DeclareInstance", the algorithm performs: (1) Look for matches (of all adjectives, prepositions, whose/which clauses) in the knowledge graph; (2) If 0 found: Create the uninitialized child instance (real singular concept) or proper noun vertex and return; (3) If 1 found: return it; (4) If >1 found, ask user which one or if the user says so, create a new one.

For a resolution pertaining to "DeclareClass", the algorithm performs (1) Look for matches in the brain graph; (2) Create the conceptual vertex and return.

For a resolution pertaining to "OptQueryInstance", the algorithm performs: (1) Compute if possible; (2) Look for matches (of all adjectives, prepositions, whose/which clauses) in the brain graph. If the class itself is not known, ask the user before creating one; (3) If 0 found: Return NotEnoughInformation; (4) If 1 found: return it; (5) If >1 found, ask user which one if looking for one ("the"); Return all if looking for "any" or "all"

For a resolution pertaining to "QueryInstance", the algorithm performs: (1) Compute if possible; (2) Look for matches (of all adjectives, prepositions, whose/which clauses) in the brain graph. If the class itself is not known, ask the user before creating one; (3) If 0 found: ask the user to provide the instance; (4) If 1 found: return it; (5) If >1 found, ask user which one if looking for one ("the"/proper noun); return all if looking for "any" or "all".

For a resolution pertaining to QueryClass", the algorithm performs: (1) Look for matches in the brain graph; (2) Ask the user to provide the class.

For a resolution pertaining to handling of the word "of", consider that the X of Y⇒(is the same as) Y's X and an X of Y⇒Y's (conceptual X). For example, "the car of John⇒ (is the same as) John's car" and "a car of the mayor⇒the mayor's (conceptual) car". Here the word "conceptual" is a hidden marker on the word "car". Also consider that "the X of the [Y's]*<noun>"==>(is the same as) "the [Y's]*<noun>'s X" (where [ . . . ]* denotes 0 or more instances of Y's), e.g., the car of the mayor's son⇒the mayor's son's car. In addition, "the X1 of the X2 of the [Y's]*<noun>"==>"the [Y's]*<noun>'s X2's X1", e.g. the car of the mayor of the state's capital⇒the state's capitol's mayor's car. The "X of a [Y's]*<noun>"==>"a [Y's]*<noun>'s X", e.g., the car of a mayor of the state's capital the state's capitol's (conceptual) mayor's car. Here the "mayor" is treated as the conceptual class. The car is thus also a conceptual child of the conceptual mayor. In addition: (a) the X1 of the X2 of a [Y's]*<noun>==>a [Y's]*<noun>'s X2's X1; (b) an X of the [Y's]*<noun>==>the [Y's]*<noun>'s (conceptual) X; (c) an X1 of the X2 of the [Y's]*<noun>==>the [Y's]*<noun>'s X2's (conceptual) X1; (d) an X1 of an X2 of the [Y's]*<noun>==>the [Y's]*<noun>'s (conceptual) X2's (conceptual) X1; (e) the X1 of an X2 of the [Y's]*<noun>==>the [Y's]*<noun>'s (conceptual) X2's X1.

For a resolution pertaining to handling of "whose/which/who", e.g., the person whose salary is highest, the database which is full, or the person who is sick is absent. In a Query/Action/Declarative clause: all nouns in the whose/which/who clauses are resolved with the QueryFieldType. In a Future Query clause: all nouns in the whose/which/who clauses are resolved with the FutureQueryFieldType. In a Procedure clause: all nouns in the whose/which/who clauses are resolved with the ProcedureFieldType.

Regarding a query field type, the steps in the noun resolution of a field of query type involve StackQueryInstance, QueryInstance and QueryClass algorithms. For the various types of noun phrases, one or more of these algorithms are applied based on the Table in FIG. 17. The Table has "start", "middle" and "leaf" columns. In the example, "the chair's arm's color's code", "the chair" is the "start", "arm" and "color" are the middle, and "code" is the "leaf". Thus, based on which part of a noun phrase is being resolved, the right column in the table is looked up to determine the applicable algorithm to use.

The StackQueryInstance approach performs: (1) Look for matches in the context sentences; (2) Look for matches from the POS; (3) Ask the user if the system should create an instance. The processing may also ask for the value if relevant.

The QueryInstance approach is performed by: (1) Compute if possible; (2) Look for matches (of all adjectives, prepositions, whose/which clauses) in the brain graph. If the class itself is not known, ask the user before creating one; (3) If 0 found: ask the user to provide the instance; (4) If 1 found: return it; (5) If >1 found: Ask user which one if looking for one ("the"/proper noun). Return all if looking for "any" or "all". E.g., if the employee's address is in New York then StackQueryInstance ("the employee"): Look for matches in the context and POS. If not found, ask user. QueryInstance ("address"): Compute the address if possible. Look for address under the employee. If not found, ask user. QueryInstance ("new york"): The proper noun is looked up from the brain graph.

Regarding QueryClass, this is performed by: (1) Look for matches in the brain graph; (2) Ask the user to provide confirmation to create the class. "Is a dog furry" resolves "a dog", where look for "a dog" is the brain graph. If not found, ask the user to provide confirmation to create the class. This is the QueryClass algorithm. "Is a dog's tail short", resolves QueryClass ("a dog"), by looking for "a dog" in the brain graph. If not found, ask the user to provide confirmation to create the class. QueryClass ("tail"), looks for the class "tail" under the "a dog" node in the brain graph. If not found as the user to provide confirmation to create the class. "Is the tail of a dog short", performed where QueryClass ("a dog") looks for "a dog" is the brain graph, and if not found, ask the user to provide confirmation to create the class; and QueryClass ("tail") looks for the class "tail" under the "a dog" node in the brain graph. If not found as the user to provide confirmation to create the class.

Regarding handling of the word "of"'s, the table shown in FIG. 17 provides that anywhere "an X of Y" is encountered it creates a conceptual child of Y. That conceptual child and all its children are processed with QueryClass algo. Different algorithms can be applied while resolving different parts of a complex noun. Regarding "Future Query Field Type", the steps in the noun resolution of a field of future query type involve StackQueryInstance, OptQueryInstance and QueryInstance algorithms. For the various types of noun phrases one or more of these algorithms are applied based on the Table in FIG. 18.

For "StackQueryInstance", this is performed by: (1) Look for matches (with all adjectives, prepositions, whose/which clauses) in the context sentences; (2) Look for matches (with all adjectives, prepositions) from the POS; (3) Ask the user if the system should create an instance. Ask for the value if relevant. E.g. "Whenever the number>10 . . . ", this resolves "the number" by looking for "the number" in the context sentences. Look in the POS map (parts of speech map) of the enclosing procedure if any. Ask the user. This is the StackQueryInstance algo. For example, "Whenever the phone number of a person is deleted . . . ", this treats "a person" as "any person", which is resolved by querying for 'all people' and then running the boolean expression with each person instead of 'a person'. If there are no people, the boolean is considered either false. To resolve 'phone number', this is resolved using OptQueryInstance algo as it is ok if the brain does not know what the phone number is.

For "OptQueryInstance", this is performed by: (1) Compute if possible; (2) Look for matches (of all adjectives, prepositions, whose/which clauses) in the brain graph. If the class itself is not known, ask the user before creating one; (3) If 0 found: Return NotEnoughInformation; (4) If 1 found: return it; (5) If >1 found: Ask user which one if looking for one ("the"). Return all if looking for "any" or "all". For "whenever the employee's address is in New York then . . . ", the StackQueryInstance ("the employee") looks for matches in the context and POS. If not found, ask the user. OptQueryInstance ("address") computes the address if possible. Look for an address under the employee. If not found, return NotEnoughInformation and assume that the condition cannot be computed at this time.

For "Whenever a phone number of a person is deleted . . . ", OptQueryInstance treats "a person" as "any person", which is resolved by querying for 'all people' and then running the boolean expression with each person instead of 'a person'. If there are no people, the boolean is considered false. If the brain does not know what a person is, it asks the user to define the class. If no people are there, then it does not bother to resolve the children (phone number). Hence if phone number is not known as a class, it won't bother the user at this stage. OptQueryInstance treats "a phone number" as "any phone number". That is resolved by querying for "all phone numbers" of the particular person chosen in the first step's iteration. If there are no phone numbers, then the boolean is returned as False. If the system does not know what phone number means, then the Boolean will return None.

For QueryInstance, this is performed by: (1) Compute if possible; (2) Look for matches (of all adjectives, prepositions, whose/which clauses) in the brain graph. If the class itself is not known, ask the user before creating one; (3) If 0 found: ask the user to provide the instance; (4) If 1 found: return it; (5) If >1 found: Ask user which one if looking for one ("the"/proper noun). Return all if looking for "any" or "all". QueryInstance is used whenever a proper noun is encountered. For "whenever the employee's address is in new york then . . . ", then QueryInstance ("new york"): is used where the proper noun is looked up from the brain graph. For "whenever john is late then . . . ", then QueryInstance ("john") is used where the proper noun is looked up from the brain graph.

For the handling of the word "of", in the table shown in FIG. 18 table, anywhere "an X of Y" is encountered it creates a conceptual child of Y. That conceptual child and all its children are processed with OptQueryClass algo.

This disclosure will now discuss how to resolve a noun of the declarative field type. For the various types of noun phrases, one or more resolution algorithms are applied based on the Table in FIG. 19. The "DeclareInstance" approach is performed by: (1) If not conceptual (not "a"): Look for matches (of all adjectives, prepositions, whose/which clauses) in the brain graph; (2) If 0 found: Create the uninitialized child instance (real concept with all adjectives, prepositions, whose/which clauses) or proper noun vertex and return; (3) If 1 found: return it; (4) If >1 found: Ask user which one or if the user says so, create a new one. For "John is a person", this is resolved by looking for John. If none, declare one. If 1, use it. If >1, ask user which one or new one. This is the DeclareInstance algorithm. For "John's age is 21", this resolve john as above. To resolve age, look for age under John. If none, declare one. If 1, use it. If >1, ask user which one or new one. For "John's son is Adam", this resolves john. To resolve son, look for son under John. If none, declare one. If 1, use it. If >1, ask user which one or new one.

"StackDeclareFactInstance" is handled by: (1) Look for matches from the POS (parts of speech provided while calling the enclosing procedure); (2) Create an uninitialized instance (singular or plural concept) on the stack and return. For "The number is 21", this resolves 'the number' by looking for matches in the parts of speech in the enclosing procedure. Otherwise, declare a new variable on the stack. This is the StackDeclareFactInstance algorithm. For "The headcount is <code>", resolve 'the headcount' by looking for matches in the parts of speech in the enclosing procedure. Otherwise, declare a new variable on the stack. Here RHS is code, so later when the assignment is done, the code will be assigned instead of a value. Whenever the value is needed the code will be executed. The system can define some caching policy in the future.

For "DeclareClass", this is addressed by performing: (1) Look for matches in the brain graph; (2) Create the conceptual vertex and return.

Regarding the handling of the word "of", in the table of FIG. 19, anywhere "an X of Y" is encountered it creates a conceptual child of Y. That conceptual child and all its children are processed with DeclareClass algorithm.

Regarding resolving a noun of the action field type, the StackDeclareInstance, QueryInstance, DeclareInstance algorithms are used. For the various types of noun phrases one or more of these algorithms are applied according to the table in FIG. 20. "StackDeclareInstance" is performed by: (1) If "the . . . ": Look for matches in the context sentences; (2) If "the . . . ": Look for matches from the POS; (3) Create an uninitialized instance (singular or plural concept) on the stack and return.

In some embodiments, "Of a" is not supported whereas "Of the" is supported. In the table of FIG. 20, anywhere "an X of Y" is encountered it creates a conceptual child of Y. That conceptual child and all its children are processed with DeclareInstance algorithm.

For a procedure field type, the steps in the noun resolution of a field of procedure type involves DeclareClass and StackQueryInstance, QueryInstance algorithms. For the various types of noun phrases one or more of these algorithms are applied according to the Table in FIG. 21. For "DeclareClass", this is performed by: (1) Look for matches in the brain graph; (2) Create the conceptual vertex and return. For "StackQueryInstance", this is performed by: (1) Look for matches in the context sentences; (2) Look for matches from the POS; (3) Ask the user if the system should create an instance. Ask for the value if relevant. For "QueryInstance", this is performed by: (1) Compute if possible; (2) Look for matches in the brain graph; (3) Ask the user to provide the instance.

In the table of FIG. 21, anywhere "an X of Y" is encountered it creates a conceptual child of Y. That conceptual child and all its children are processed with a DeclareClass algorithm.

This disclosure will now describe an approach according to some embodiments for implementing a natural language interpreter or compiler that can automatically produce a natural language trace of any natural language program it runs.

To explain, consider that computers are typically programmed using computer languages. Normally, when a computer runs a program written in a computer language, it does so without being able to explain back to a human what it did in a language that the human can readily understand. That is the reason when computer programmers want to debug a computer program, they often add "print" statements as part of the program in an effort to produce a trace of what happened at key points in the program. However, conventional computing/debugging technologies do not provide a computing system which eliminates the need for having these "print" statements by automatically generating trace commands in natural language for each step that the computer took while running the program.

FIG. 22 shows a sample computer program written in Python. Now, a human (especially programmers) looking at this program may be able to guess what is happening, but when a computer is running the statement "send (msg, person)", it does not have enough context to automatically translate that into a natural language explanation of what is happening. In fact, most compilers will strip out the symbol names for storage efficiency and also optimize away some statements, or reorder statements for computational efficiency. All the transformations that compilers perform renders it nearly impossible to general a meaningful explanation of what happened in a language that humans will understand. This is the reason that when programs crash, it is usually insufficient to look at the "dump" of the program, and developers usually resort to reproducing the problem while running step by step in a debugger where they can explicitly look at the state of the variables and infer what is happening. In cases where the luxury of debuggers is not available or it is too slow, the developers will add print statements in the program to create a more human readable trace of what happened. However, creating any human readable trace requires explicit instructions to be added to the original program and normally is only done where deemed necessary.

Now, consider the same program, but this time written in natural language as shown in FIG. 23. Here, most humans who do not know computer programming will still be able to explain what is meant by this program. A computer system capable of running such a natural language program is well positioned to be able to produce a human-intelligible natural language trace of what was executed. This disclosure will now examine how that is done for this program.

The first two lines "to invite . . . " are teaching the computer how to invite a person. So, the computer simply writes a trace mentioning that it "learned how to invite a person with a message". Note that since the program is in natural language, this permits creating a trace using that natural language.

Next the computer runs 'Invite John with "welcome" message'. Here the computer realizes that it needs to run the procedure "to invite a person with a message" wherein, "a person" will map to "John" and "a message" will map to "welcome". Thus, when "send the message to the person" is run, a trace of "send 'welcome' to John" is created by replacing the placeholders "the message" and the "the person" with the concrete values that were used during runtime.

Hence that becomes the next trace which is nested under the first trace as shown in FIG. 24. In this manner, the system obtains a natural language human-readable trace for a computer program without the need for explicit "print" statements in the code.

Figure 25:
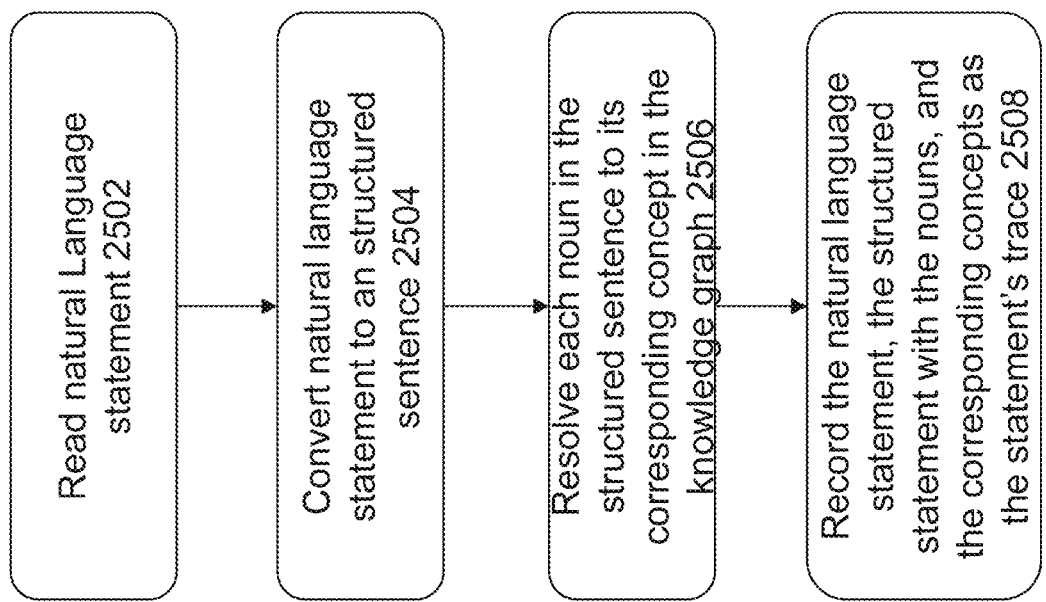
FIG. 25 provides an approach to implement recording of relevant information while executing natural language programs in order to facilitate natural language traces of the program at a subsequent time.

FIG. 25 provides an approach to implement recording of relevant information while executing natural language programs in order to facilitate natural language traces of the program at a subsequent time.

At 2502, the processing will read the natural language statement, and at 2504, will convert it to a structured sentence. A structured sentence can be of any format, like a JSON structure, an example of which is shown in Appendix 1 of U.S. Prov. Application No. 63/105,176, filed on Oct. 23, 2020, which is hereby incorporated by reference in its entirety.

To explain, consider the natural language statement: "continuously move the circle". FIG. 26 shows a structured sentence (AST) that can be derived from that natural language statement. There are many other ways to represent the sentence structure, but the main idea is to separate out the parts of speech and determine which nouns need to be resolved into instances. In the above example, "the circle" needs to be resolved into which instance of the circle it is referring to. As the system executes commands, it builds a knowledge graph and in the example, "the circle" refers to a circle in "the scene" introduced previously in the program. As noted at step 2506, each noun is resolved in the structured sentence. This resolution of nouns based on the nouns that have been seen earlier in the program and/or are part of the knowledge graph is described above with regards to noun resolution.

Once the mapping from the natural language nouns (for example, "the circle") to the corresponding instances (an internal reference or an ID of the instance of the circle) is done, the natural language statement is executed. The trace consisting of the original natural language statement, the structured statement (AST), and the resolved nouns, is stored by the system in a database or file (2508).

Figure 27:
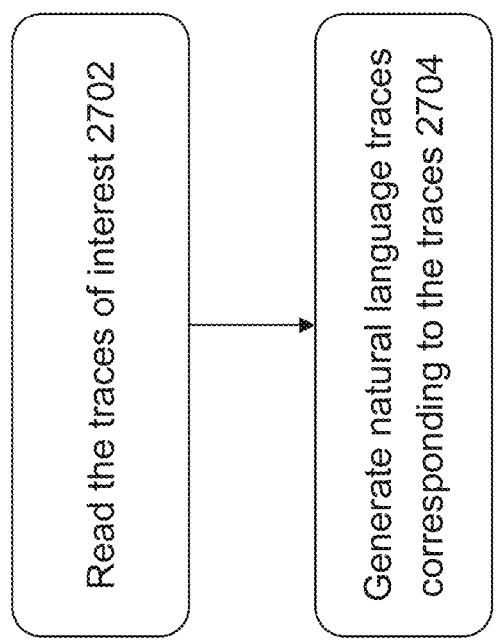
FIG. 27 provides an illustration of a flowchart of processing for traces according to some embodiments of the invention.

FIG. 27 provides an illustration of a flowchart of processing for traces according to some embodiments of the invention. At a certain point time, when a natural language trace of a portion of the execution of the program is required to be presented, the system refers to the trace (e.g., reads the trace of interest at step 2702) and uses the structured statement and the resolved nouns to generate concrete natural language statements at step 2704. Concrete natural language statements are statements which replace the nouns with determiners with actual instances. For example, "send the file to the employee" is not concrete. However, "send 'statement.pdf' to John" is concrete. To do this the system replaces the nouns in the structured statement (AST) with the concrete values, and then converts from the structures AST to a natural language statement.

Figure 28:
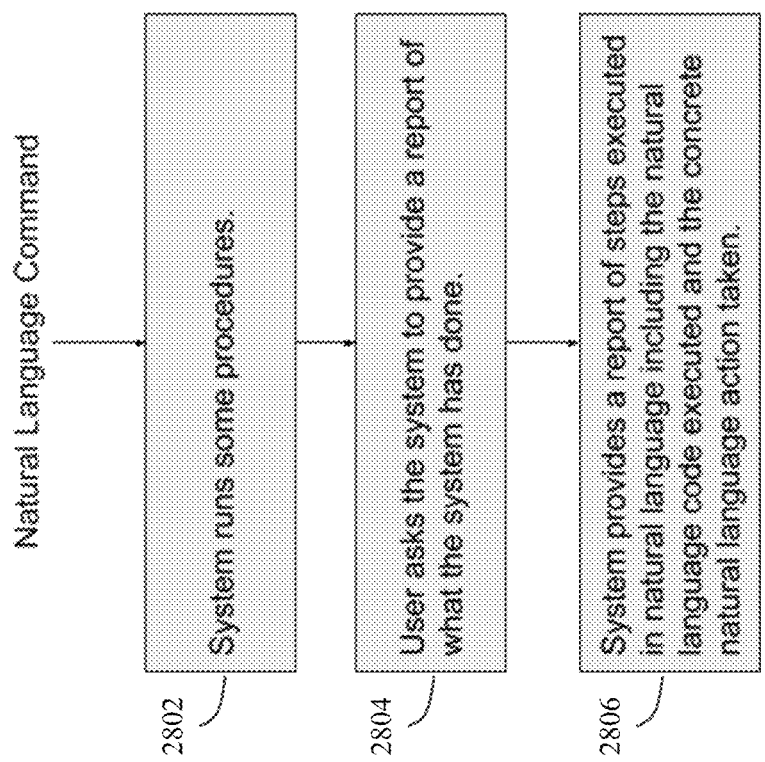
FIG. 28 illustrates that the system may engage in the running of a given procedure.

Therefore, the invention provides a significant advancement in the field of programming in the ability to explain what has happened in natural language back to the user. The system is able to answer any question about its decisions and the path it has taken so far in plain natural language. In FIG. 28, at 2802, the system may engage in the running of a given procedure. At 2804, the user may ask the system to provide a report of what has occurred. At 2806, the system provides the report as a sequence of natural language steps, as described above.

Figure 29:
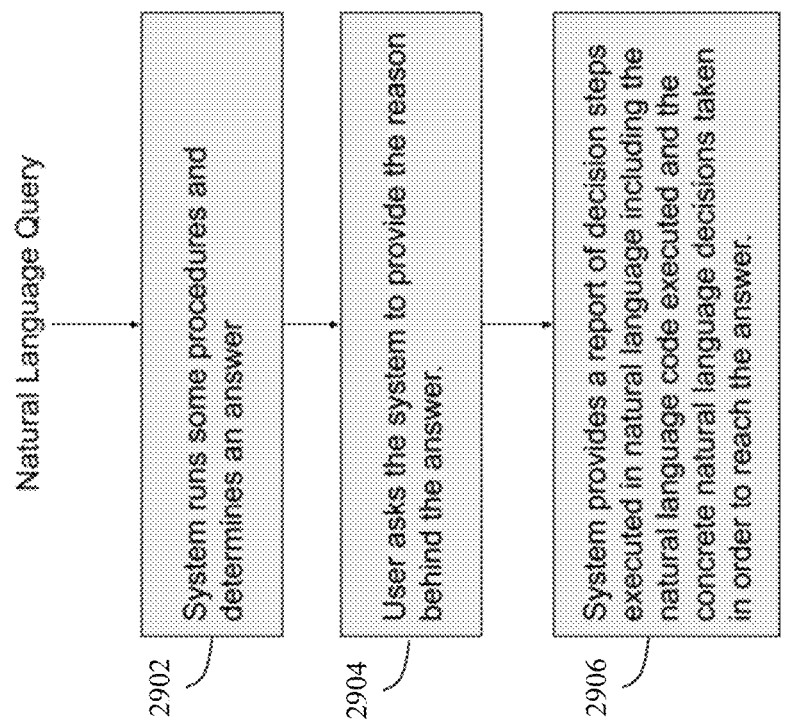
FIG. 29 shows a flowchart of a sequence of steps according to some embodiments which permits a user to understand the decision steps taken by the system.

FIG. 29 shows a flowchart of a sequence of steps according to some embodiments which permits a user to understand the decision steps taken by the system. At 2902, the system may engage in the running of a given procedure, and an answer may be determined by the system. At 2904, the user may ask the system to provide a statement of the reasons for the answer that is provided. At 2906, the system provides a report of the decision steps that were taken to the user. The report may be in a natural language format, and may include a list of the natural language code that was executed to achieve the answer.

These advancements in explainability allow the user to better understand what happened in the system. For example, the user can ask 'how many times did you send an email to John this month', or simply 'what happened' or 'why'. In addition, this approach allows the user to better identify faults in the programming that may have caused bad behavior. If there is a logic error in the program, seeing a trace of what happened in plain English is the best way to figure out what went wrong. This is not possible in the state of the art as most systems will give a stack-trace of code which is quite un-intuitive for a non-programmer. Furthermore, this approach allows for a change and restart of the program from a point in the past (but not necessarily all the way to the beginning of the task at hand). For example, if the command was to look for something in a house, when the system returns without anything found, the user may instruct the system to go back a few steps and retry after modifying a few commands (for example, opening the vault as well).

These capabilities are made possible by having the system record how everything it computes as it goes about processing statements. It not only records what commands were run, but it also records the current context at the time the commands were run. The system also remembers the old values of any values it overwrites. The system is able to translate any statement it executed into concrete terms. For example, the command "the number is prime" in the above example, when executed is not only recorded as the statement above, but also is recorded with the concrete number in place "41 is prime". In another embodiment, the concrete version is computed only when demanded and only the mapping from "the number" to "41" is stored. To make the action of reverting some steps and retrying more accurately possible, the user can also teach the system how to "undo" certain operations. For example, the user can define two procedures, "to move an object . . . " and "to unmove an object" or the user can use another syntax to describe the equivalent logic like "to move an object . . . to revert . . . ". Whenever such revert capability is available, the system uses that when the user wants to revert to an older state.

Therefore, what has been described is an improved approach to program behavior using natural language. Also described is an approach to debug and examine what happened in the past via a natural language interface. Some embodiments use a combination of natural language understanding techniques, knowledge representation techniques, advanced compiler techniques and user interaction techniques, to solve for natural language programming and debugging of computers.

System Architecture Overview

Figure 30:
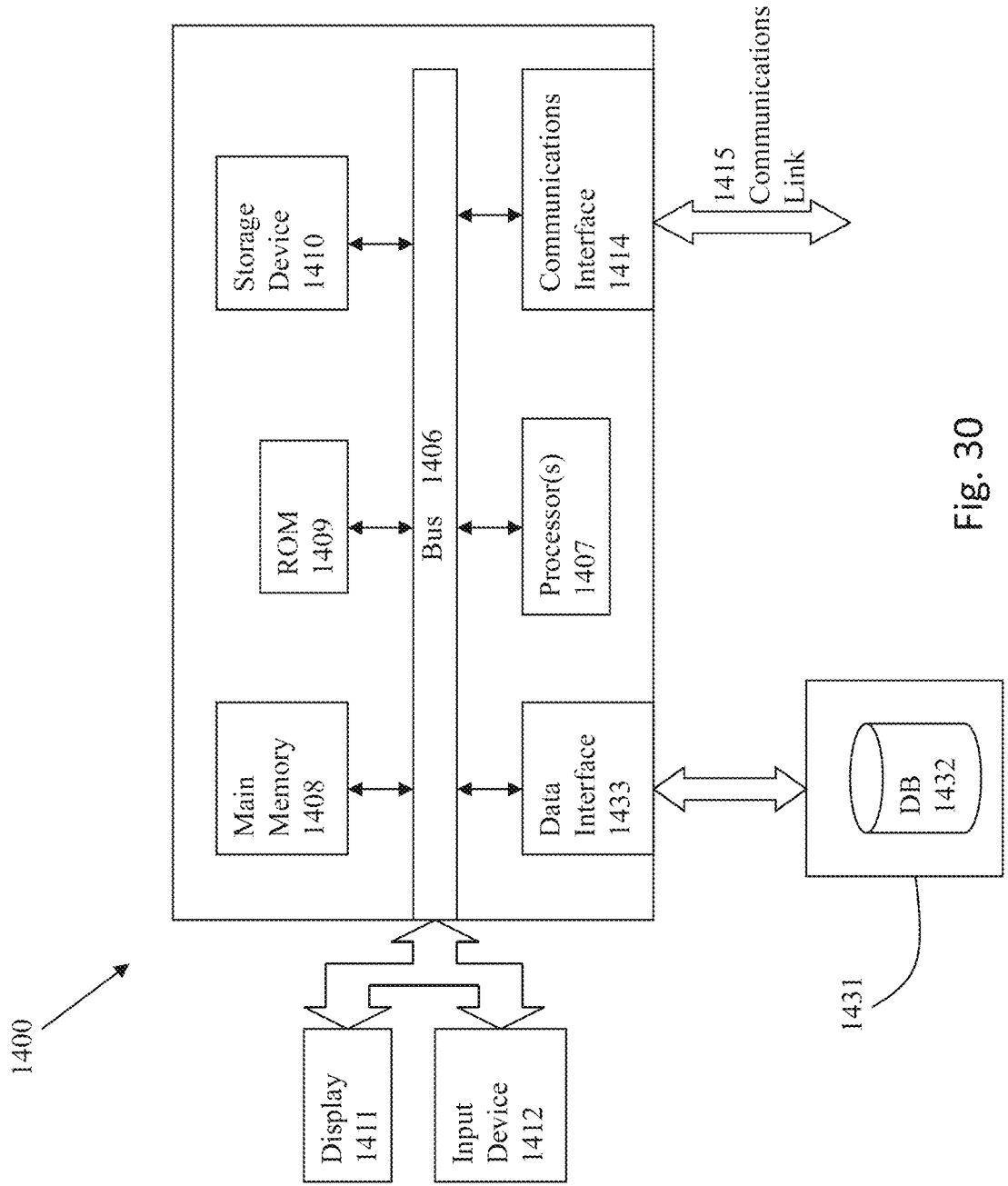
FIG. 30 is a block diagram of an illustrative computing system 1400 suitable for implementing an embodiment of the present invention.

FIG. 30 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be accessed in a computer readable medium 1431 using a data interface 1433.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
    operating a software application that utilizes an interface to receive commands from a user;
    receiving a command during the execution of the software application for functionality that is not programmed into the software application;
    fetching logic corresponding to the functionality; and
    implementing the logic by the software application for the software application to learn the functionality, wherein natural language is used through the interface to implement the logic;
    wherein a value is unknown during runtime of the software application, and the logic is used to compute the value, wherein the value is set to continue execution of the software application.

2. The method of claim 1, wherein the logic is implemented by the software application during runtime.

3. The method of claim 2, wherein the logic is implemented during runtime by a process comprising:
    without exiting from the current execution of the software application:
        identifying a knowledge graph associated with the software application, wherein the knowledge graph comprises information for procedures performed by the software application;
        updating the knowledge graph to include a new procedure associated with the logic for the functionality;
    wherein the software application continues its currently executing runtime to execute the functionality by:
        querying the knowledge graph to identify the new procedure for the functionality; and implementing the user command by running the new procedure.

4. The method of claim 1, wherein a question and response interface is implemented to use the natural language to implement the logic in the software application.

5. The method of claim 1, wherein a search of an external knowledgebase is performed for the logic, and the logic is fetched from the external knowledgebase to implement in the software application.

6. The method of claim 1, wherein the software application requests information from a human user to fetch the logic.

7. The method of claim 1, wherein the software application performs at least one of: (a) skip a current instruction and continue; (b) rewind to a same or a previous statement in program logic and retry; (c) replace the current instruction with one or more new instructions and continue.

8. The method of claim 1, wherein a delegation is performed from a first source of knowledge to a second source of knowledge for the logic.

9. The method of claim 8, wherein the first source of knowledge or the second source of knowledge may be selected from at least one of a human or an automated system.

10. The method of claim 1, wherein a learning service is used to provide the logic.

11. The method of claim 1, wherein crowdsourcing is used to provide the logic.

12. The method of claim 1, wherein the natural language is processed by analyzing words and symbols in the natural language to create an abstract syntax tree (AST).

13. The method of claim 12, wherein a word or an action in the AST is resolved to a knowledge graph.

14. The method of claim 13, where the action is resolved to a procedure in the knowledge graph.

15. The method of claim 14, wherein the procedure is run to execute the command.

16. The method of claim 14, wherein the procedure is defined using the natural language.

17. The method of claim 13, wherein an environment parameter is used to resolve the word or action.

18. A computer program product embodied on a computer readable medium, the computer readable medium having stored thereon a sequence of instructions which, when executed by a processor, performs:
    operating a software application that utilizes an interface to receive commands from a user;
    receiving a command during the execution of the software application for functionality that is not programmed into the software application;
    fetching logic corresponding to the functionality; and
    implementing the logic by the software application for the software application to learn the functionality, wherein natural language is used through the interface to implement the logic;
    wherein a value is unknown during runtime of the software application, and the logic is used to compute the value, wherein the value is set to continue execution of the software application.

19. The computer program product of claim 18, wherein the logic is implemented by the software application during runtime.

20. The computer program product of claim 18, wherein a question and response interface is implemented to use the natural language to implement the logic in the software application.

21. The computer program product of claim 18, wherein a search of an external knowledgebase is performed for the logic, and the logic is fetched from the external knowledgebase to implement in the software application.

22. The computer program product of claim 18, wherein a delegation is performed from a first source of knowledge to a second source of knowledge for the logic.

23. The computer program product of claim 18, wherein the natural language is processed by analyzing words and symbols in the natural language to create an abstract syntax tree (AST).

24. A system, comprising:
    a processor;
    a memory for holding programmable code; and
    wherein the programmable code includes instructions for:
        operating a software application that utilizes an interface to receive commands from a user; receiving a command during the execution of the software application for functionality that is not programmed into the software application; fetching logic corresponding to the functionality; and implementing the logic by the software application for the software application to learn the functionality, wherein natural language is used through the interface to implement the logic; wherein a value is unknown during runtime of the software application, and the logic is used to compute the value, wherein the value is set to continue execution of the software application.

25. The system of claim 24, wherein the logic is implemented by the software application during runtime.

26. The system of claim 24, wherein a question and response interface is implemented to use the natural language to implement the logic in the software application.

27. The system of claim 24, wherein a search of an external knowledgebase is performed for the logic, and the logic is fetched from the external knowledgebase to implement in the software application.

28. The system of claim 24, wherein a delegation is performed from a first source of knowledge to a second source of knowledge for the logic.

29. The system of claim 24, wherein the natural language is processed by analyzing words and symbols in the natural language to create an abstract syntax tree (AST).

* * * * *